United States Patent [19]

Driscoll et al.

[11] Patent Number: 5,142,681

[45] Date of Patent: Aug. 25, 1992

[54] APL-TO-FORTRAN TRANSLATORS

[75] Inventors: Graham C. Driscoll, Hartsdale; Donald L. Orth, Carmel, both of N.Y.

[73] Assignee: International Business Machines Corporation, Armonk, N.Y.

[21] Appl. No.: 577,841

[22] Filed: Aug. 31, 1990

Related U.S. Application Data

[63] Continuation of Ser. No. 882,737, Jul. 7, 1986, abandoned.

[51] Int. Cl.⁵ .................................. G06F 9/45
[52] U.S. Cl. ........................... 395/700; 364/262.4; 364/262.9; 364/951.1; 364/977; 364/DIG. 2; 395/325
[58] Field of Search ... 364/200 MS File, 900 MS File, 364/DIG. 1, DIG. 2; 395/700, 375

[56] References Cited

U.S. PATENT DOCUMENTS

| | | | |
|---|---|---|---|
| 3,794,984 | 2/1974 | Deerfield et al. | 364/200 |
| 4,309,756 | 1/1982 | Beckler | 364/300 |
| 4,374,408 | 2/1983 | Bowles et al. | 364/200 |
| 4,398,249 | 8/1983 | Pardo et al. | 364/300 |
| 4,430,708 | 2/1984 | Issman | 364/200 |
| 4,463,423 | 7/1986 | Potash et al. | 364/300 |
| 4,484,272 | 11/1984 | Green | 364/200 |
| 4,656,582 | 4/1987 | Chaitin et al. | 364/300 |
| 4,667,290 | 5/1987 | Goss | 364/300 |
| 4,692,896 | 9/1987 | Sakoda et al. | 364/900 |
| 4,698,751 | 10/1987 | Parvin | 364/200 |
| 4,736,255 | 8/1988 | Hopkins | 364/300 |
| 4,771,380 | 9/1988 | Kriss | 364/200 |
| 4,773,007 | 9/1988 | Kanada | 364/300 |
| 4,791,558 | 12/1988 | Chaitin et al. | 364/300 |
| 4,802,091 | 1/1989 | Cocke | 364/200 |
| 4,819,152 | 4/1989 | Deerfield | 364/200 |
| 4,829,427 | 5/1989 | Green | 364/300 |
| 4,839,853 | 6/1989 | Deerwester | 364/900 |
| 4,860,204 | 8/1989 | Gendron | 364/513 |

OTHER PUBLICATIONS

Program improvement by source to source transformation Journal of the Assoc. for Computing Mach. vol. 24, No. 1, Jan. 1977, pp. 121-145.

Program analysis and code generation in an APL/370 compiler, IBM Journal of Research and Dev., vol. 30, No. 6, Nov. 1986, pp. 594-602 by W. M. Ching.

"Compiling APL: The Yorktown APL translator", IBM Journal of Research and Development, vol. 30, No. 6, Nov. 1986, pp. 583-593, by Driscoll et al.

An introduction to STSC's APL compiler, Conference Proc. APL Quote Quad, May 1985, pp. 231-238 by J. Weigang.

The APL compiler for the UNIX time sharing system, APL Quote Quad, vol. 13, No. 3, Mar. 1983, pp. 205-209 by T. A. Budd.

(List continued on next page.)

Primary Examiner—David Y. Eng
Assistant Examiner—Eric Coleman
Attorney, Agent, or Firm—Thomas P. Dowd

[57] ABSTRACT

The present invention relates to apparatus and method for translating computer programs in an application from an array source language—having attributes of APL—to a scalar target language. In particular, source language primitive functions—which can be used in different cases—are represented by archetypes having code that is selectable based on applicable case(s). In determining which case (or cases) applies, each program is re-structured into a sequence of simple source language expressions and a static analysis is performed. The static analysis, which includes a shape analysis of arrays in a program, provides information useful in determining cases for archetypes and for determining whether code generated for a particular simple expression may be beneficially merged with code generated for another simple expression. In one embodiment, the source language is translated to target language code which is, in turn, compiled by a target language compiler, thereby providing a two-step source language compiler.

36 Claims, 23 Drawing Sheets

OTHER PUBLICATIONS

*APL/Fortran translations* IBM Research Report, RC-3644, 1971 IBM T. J. Watson Research Center, N.Y., by V. L. Moruzzi pp. 1-5.

Webster's Ninth New Collegiate Dictionary, Merriam Webster Pub. Springfield, Mass., 1985, pp. 70, 733.

Abrams, P. S. "An APL Machine." Stanford Electronics Lab Technical Report 3, 1970.

Aguilar, R. et al. "APL to System/7 Assembler Compiler" IBM Madrid Scientific Center. Nov. 1973.

Andronico, A. et al. "A Portable APL Translator" Proc. ACM Conference on APL, 1975, pp. 20-25.

Ashcroft, E. A., "Towards an APL Compiler", Proceedings of the APL 6 Conference, 1974, pp. 28-38.

Budd, T. A., "An APL Compiler for the UNIX Timesharing System", Proc. ACM Conference on APL, 1983, pp. 205-209.

Chiung, W.-M., "A Portable Compiler for Parallel Machines" IEEE Conference on Computer Design: VLSI in Computers, 1984, pp. 592-596.

Compton, M. T., "APL in PL/1" IBM Res. Rep. RC 4481, IBM T. J. Watson Research Center, 1973.

Falkoff, A. D. et al., "Development of an APL Standard" RC 7542 (32487) Computer Science, IBM T. J. Watson Research Center, 1979.

Goldberg, C. P., "Implementation Considerations in Very High Level Languages" Proceedings of the NATO Advanced Study Institute, held at Bonas France Sep. 28 to Oct. 10, 1981. Series C, Mathematics & Physics, vol. 95. D. Reidel Publishing Co., Dordrecht Holland, 1983, pp. 147-172.

Guibas, L. J. et al., "Compilation and Delayed Evaluation in APL" Fifth ACM Symposium on Principles of Programming Languages, Tucson, Ariz., 1978.

Kaplan, M. A. et al., "A General Scheme for the Automatic Inference of Variable Types" Fifth ACM Symposium on Principles of Programming Languages, Atlanta, Ga., 1976, pp. 60-75.

Johnston R. L. "The Dynamic Incremental Compiler of APL/3000" Proc. ACM Conference on APL, 1979, pp. 82-87.

Miller, T. C., "Tentative Compilation: A Design for an APL Compiler" Dept. of Computer Systems Tech. Rep. 133 (Ph.D. disseration), Yale University, May 1978.

Moruzzi, V. L. "APL/Fortran Translations" IBM Res. Rep. RC 3664, IBM T. J. Watson Research Center, 1971.

Roeder, R. D. et al., "Type Determination in an Optimizing Compiler for APL" ACM TRANS on Programming Language. Iowa State University Computer Science. Tech. Rep. Series, (not yet published, waiting for final review).

Saal, H. J. "Considerations in the Design of a Compiler for APL" APL Quote Quad 8, No. 4 (1977).

Schappelle, S. J., "APLTRAN Users Manual" IBM FSD, Owego, New York, May 1978.

Sybalsky, J. D., "An APL Compiler for the Production Environment" Proc. APL80 Conference, North-Holland, 1980, pp. 71-74.

Van Dyke, E. J., "A Dynamic Incremental Compiler for an Interpretive Language" Hewlett-Packard Journal 28, 11, Jul., 1977, pp. 71-74.

Weiss, Z. et al., "Compile Time Syntax Analysis of APL Programs" APL 81 Conference Proceedings, pp. 313-320, 1981.

Wiedmann, C. "A Performance Comparison between an APL Interpreter and Compiler" Proc. APL 83 Conference, Washington, D.C., (Apr. 1983) pp. 211-217.

Weigang, J. "An Introduction to STSC'S APL Compiler" ACM Conference on APL, 1985, pp. 231-238.

Wiedman, C. "Steps Toward an APL Compiler" Proc. ACM Conference on APL, 1979, pp. 321-328.

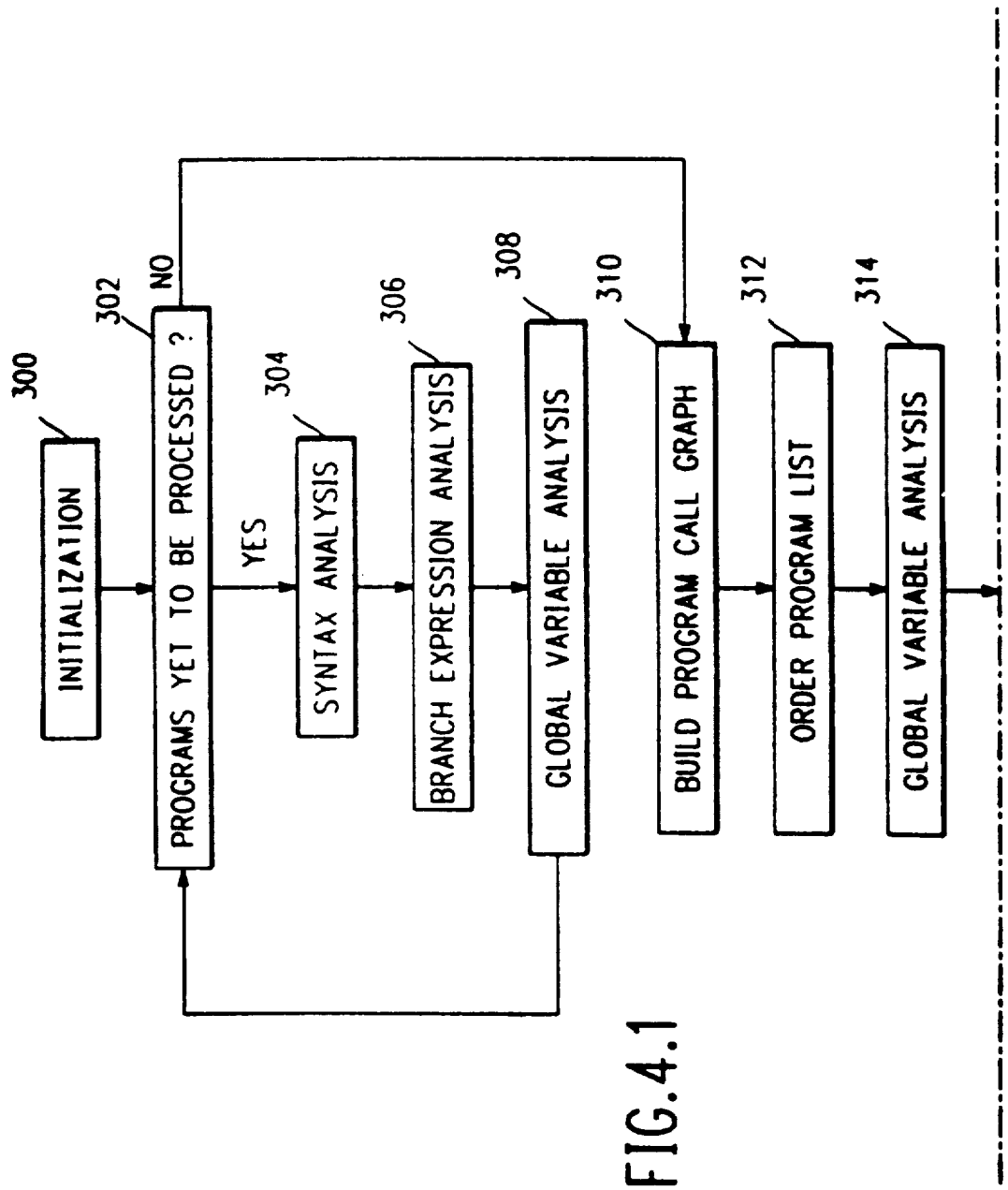
FIG.4.1

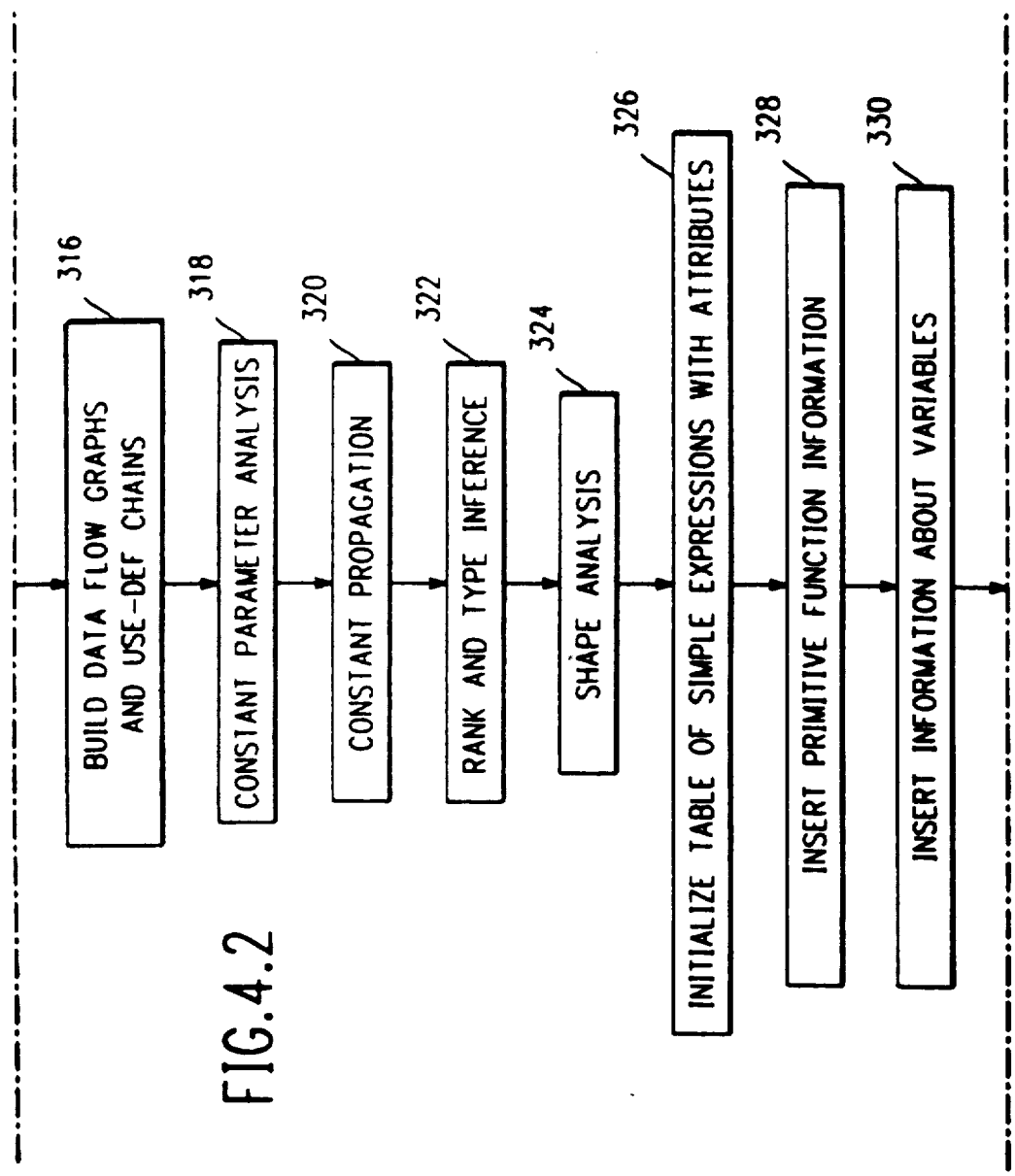
FIG.4.2

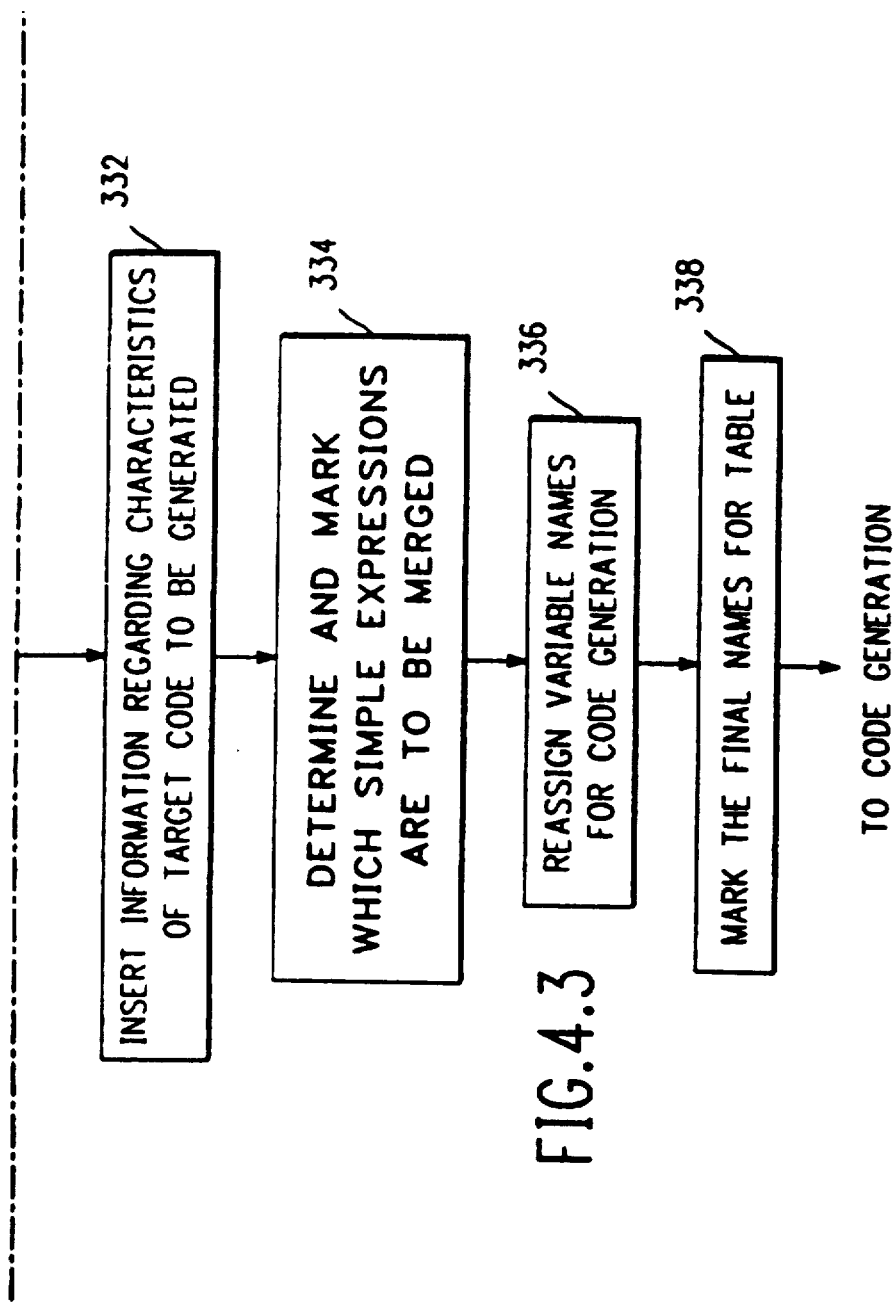
FIG.4.3

Sign of A and B Known $$N_{10} = A+B$$

FIG. 8 $T_5 = (N_2, N_{10}) \uparrow T$ $\underbrace{\phantom{(N_2,N_{10})}}_{\text{INFORMATION PASSED FOR CODE GENERATION PROCESSING}}$

Sign of A and B Not Known $$N_6 = A+B$$

$$N_{10} = |N_6|$$

FIG. 9 $T_5 = (N_2, N_6) \uparrow T$ $\underbrace{\phantom{(N_2,N_6)}}_{\text{INFORMATION PASSED FOR CODE GENERATION PROCESSING}}$

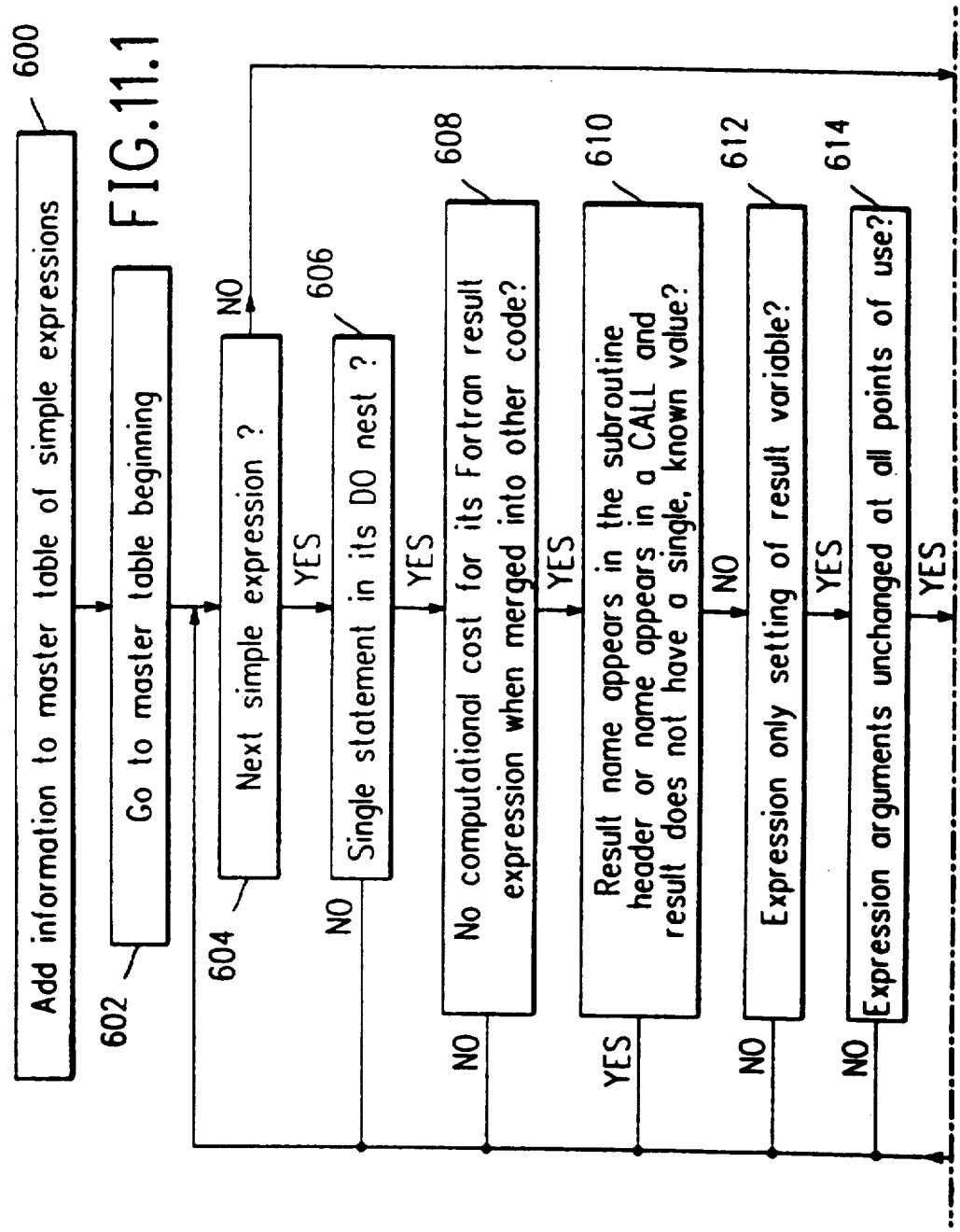

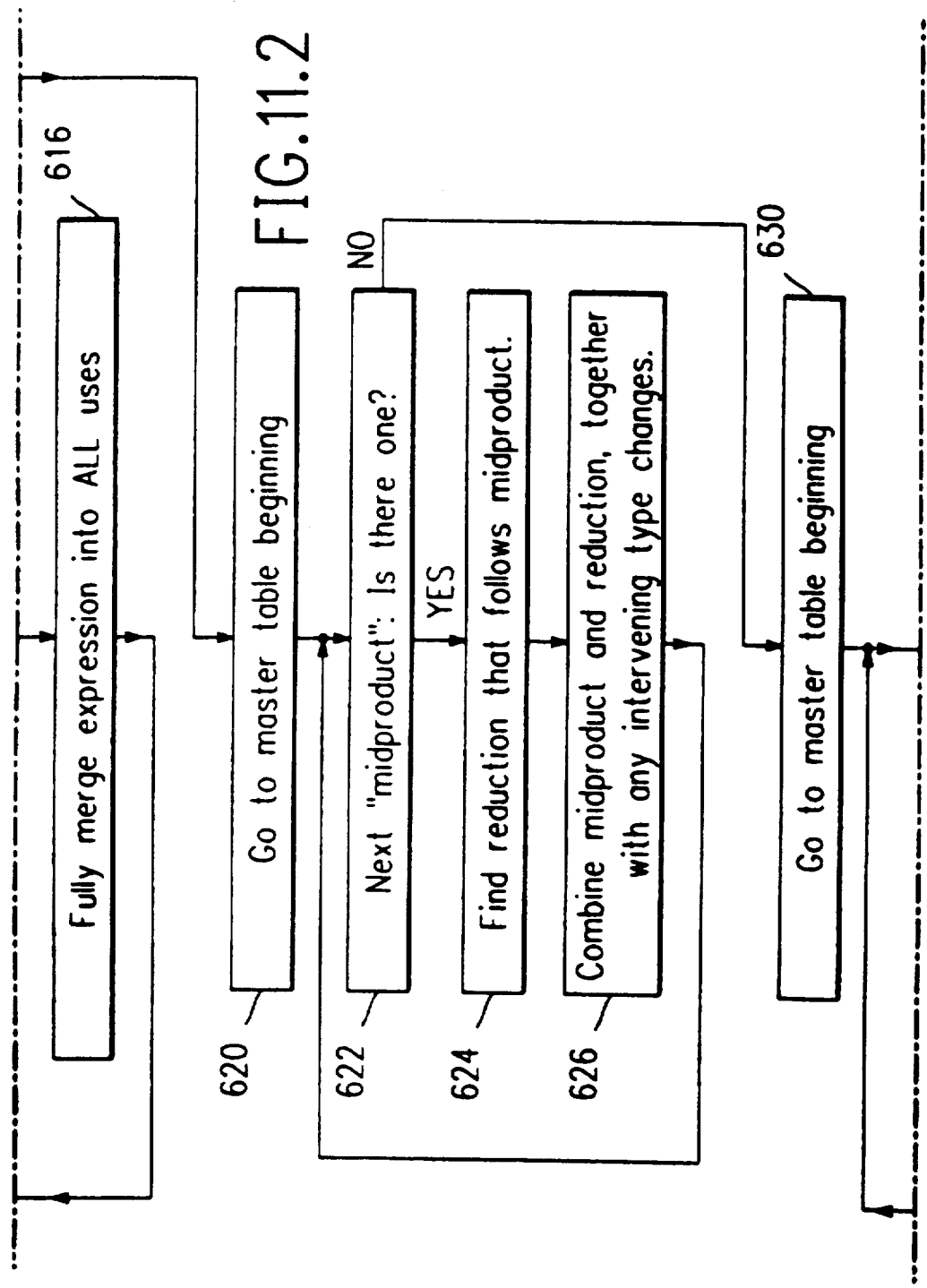

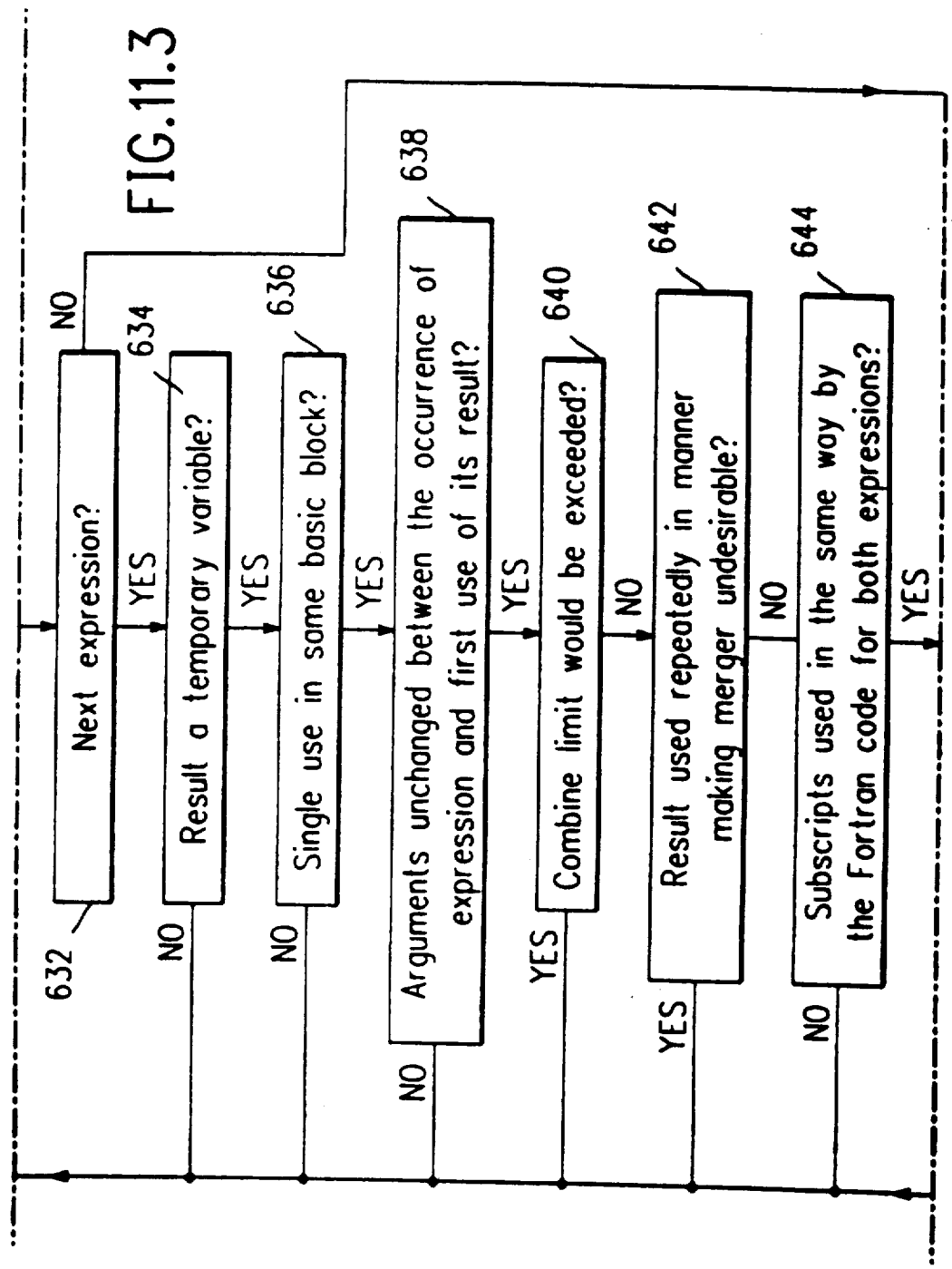

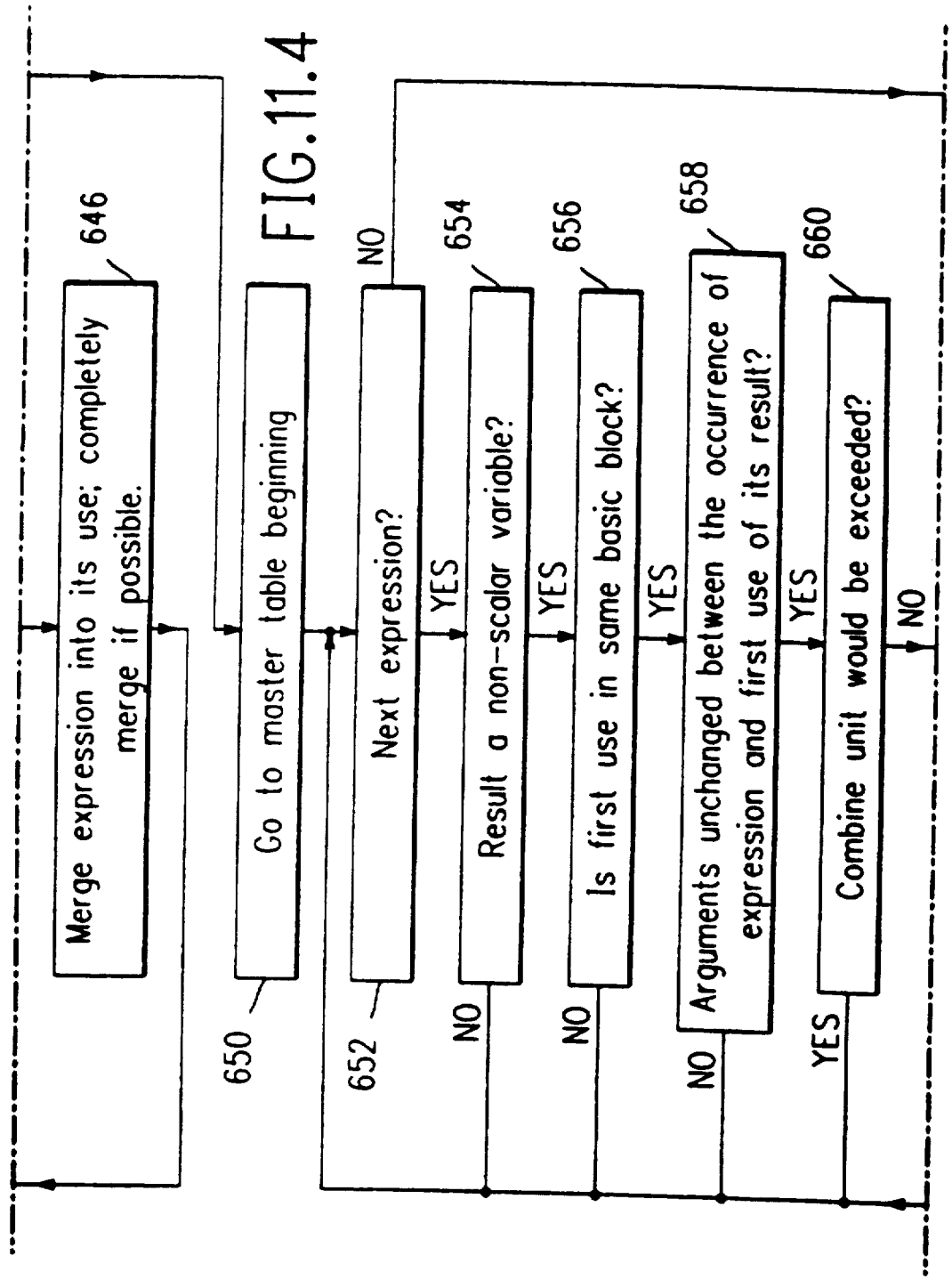

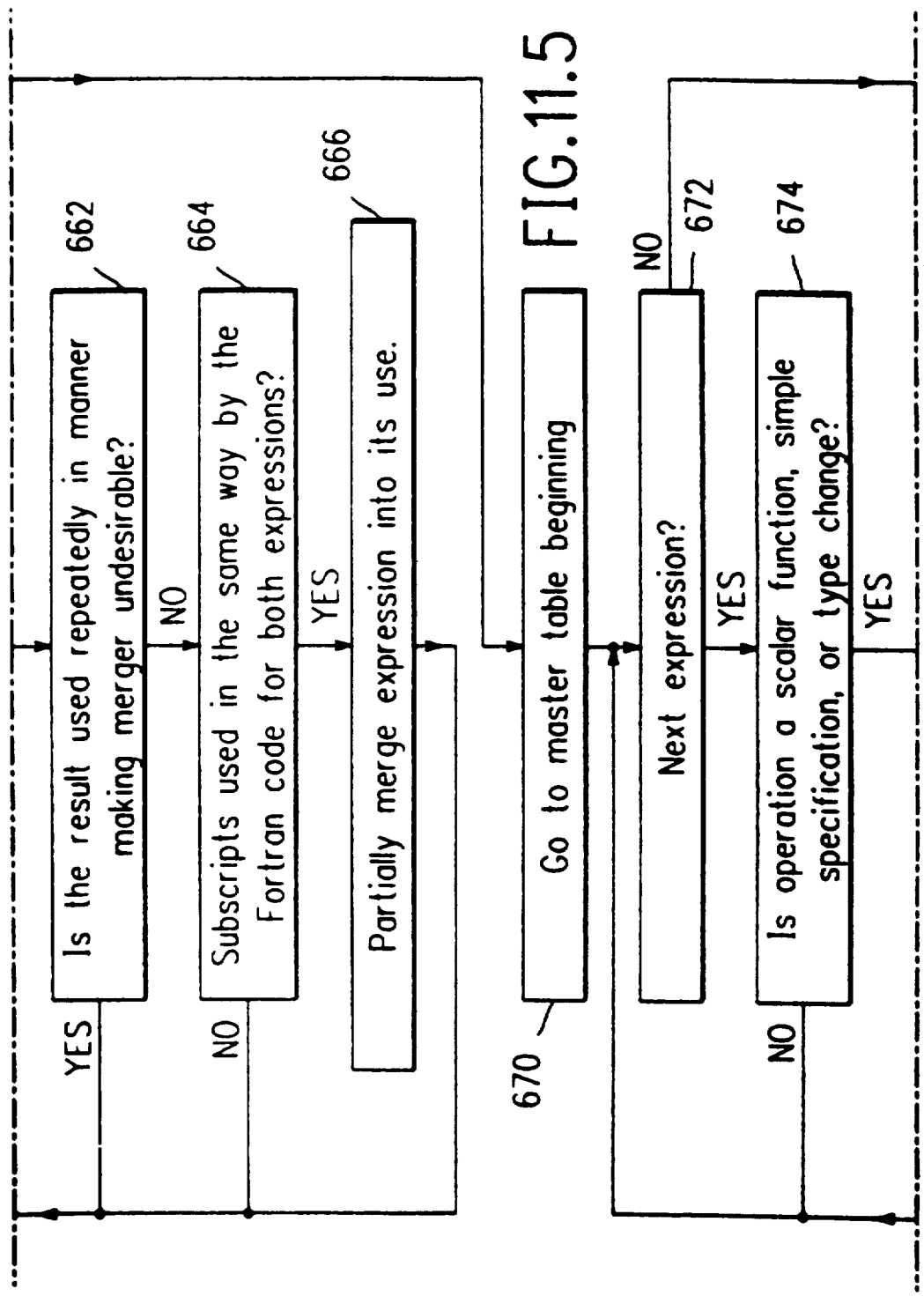
FIG. 11.5

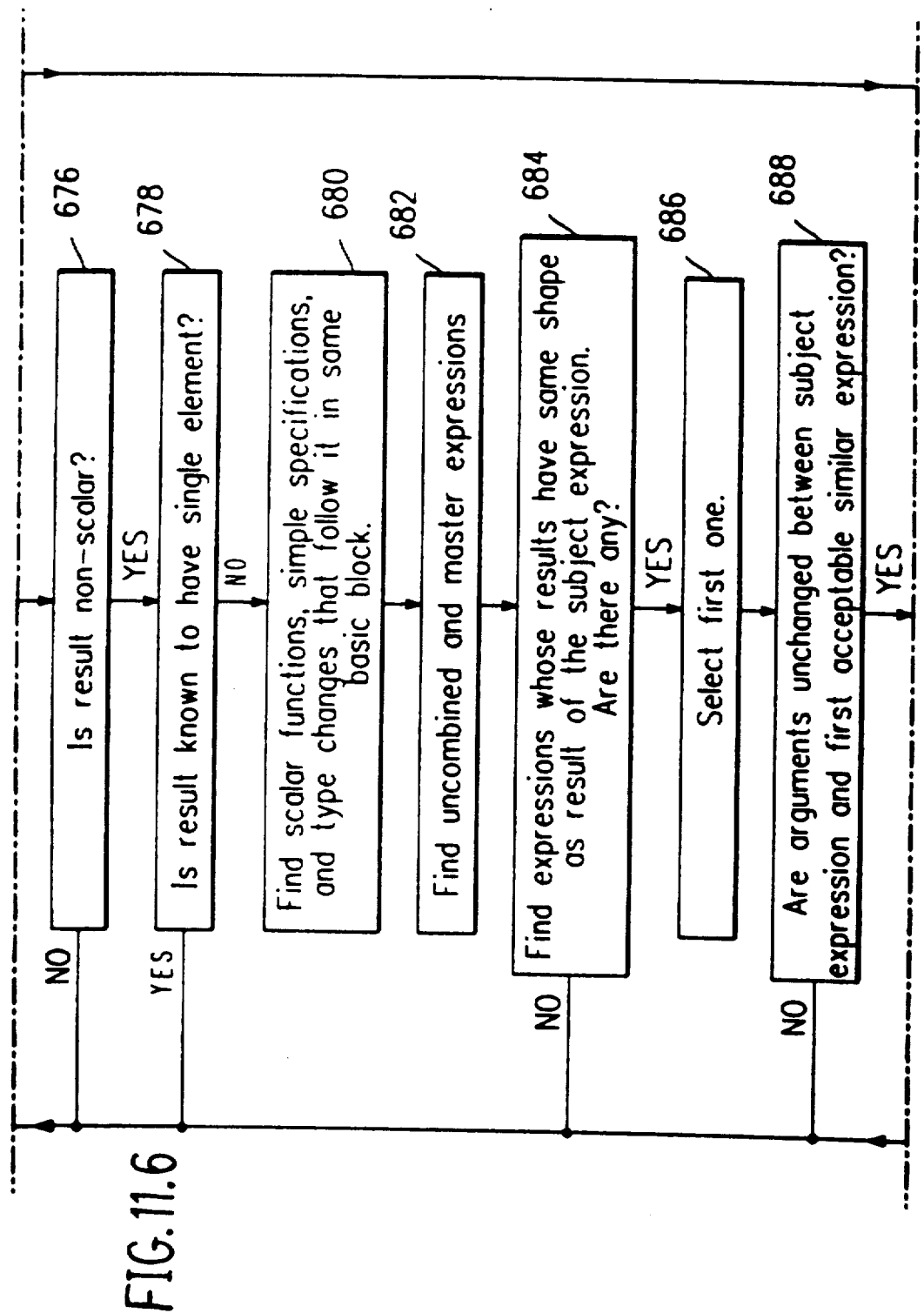
FIG.11.6

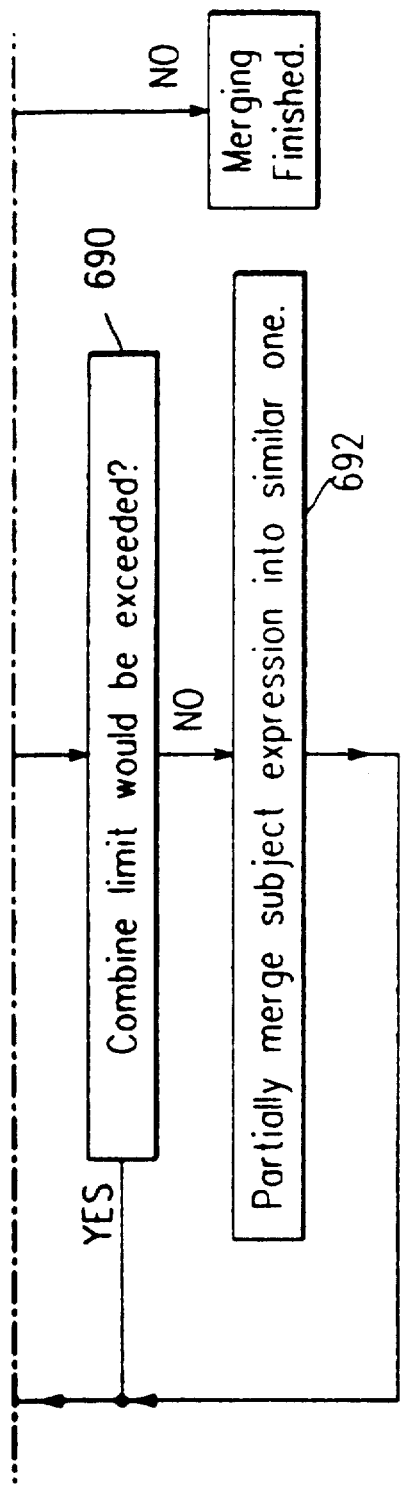
FIG.11.7
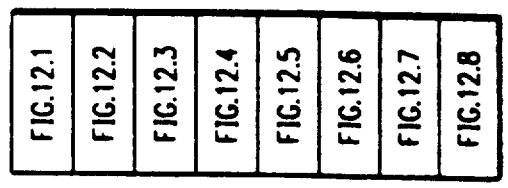
FIG.12
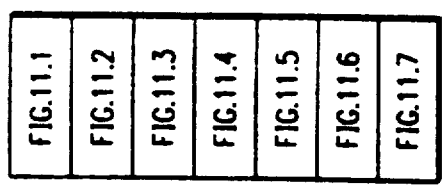
FIG.11

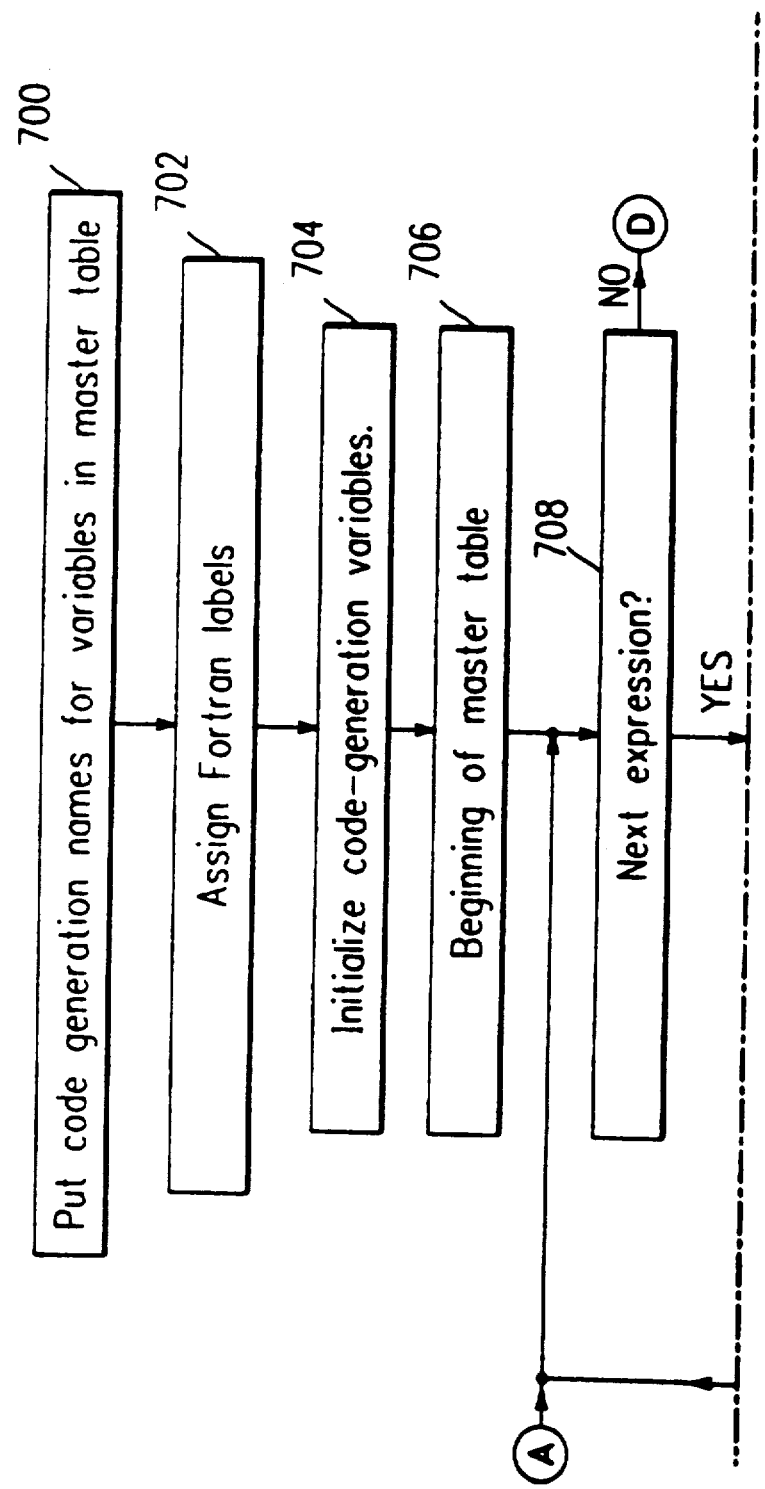

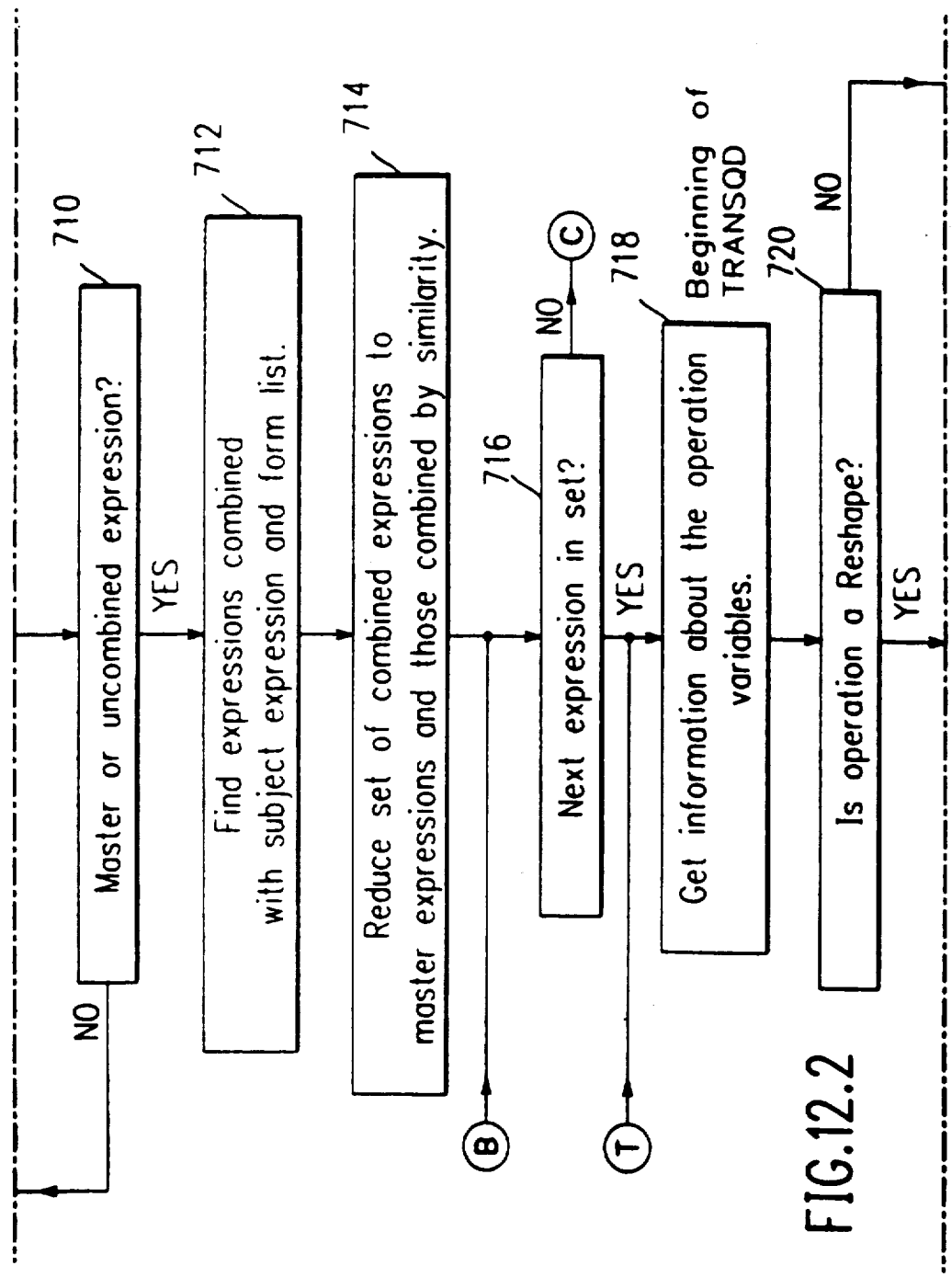
FIG.12.2

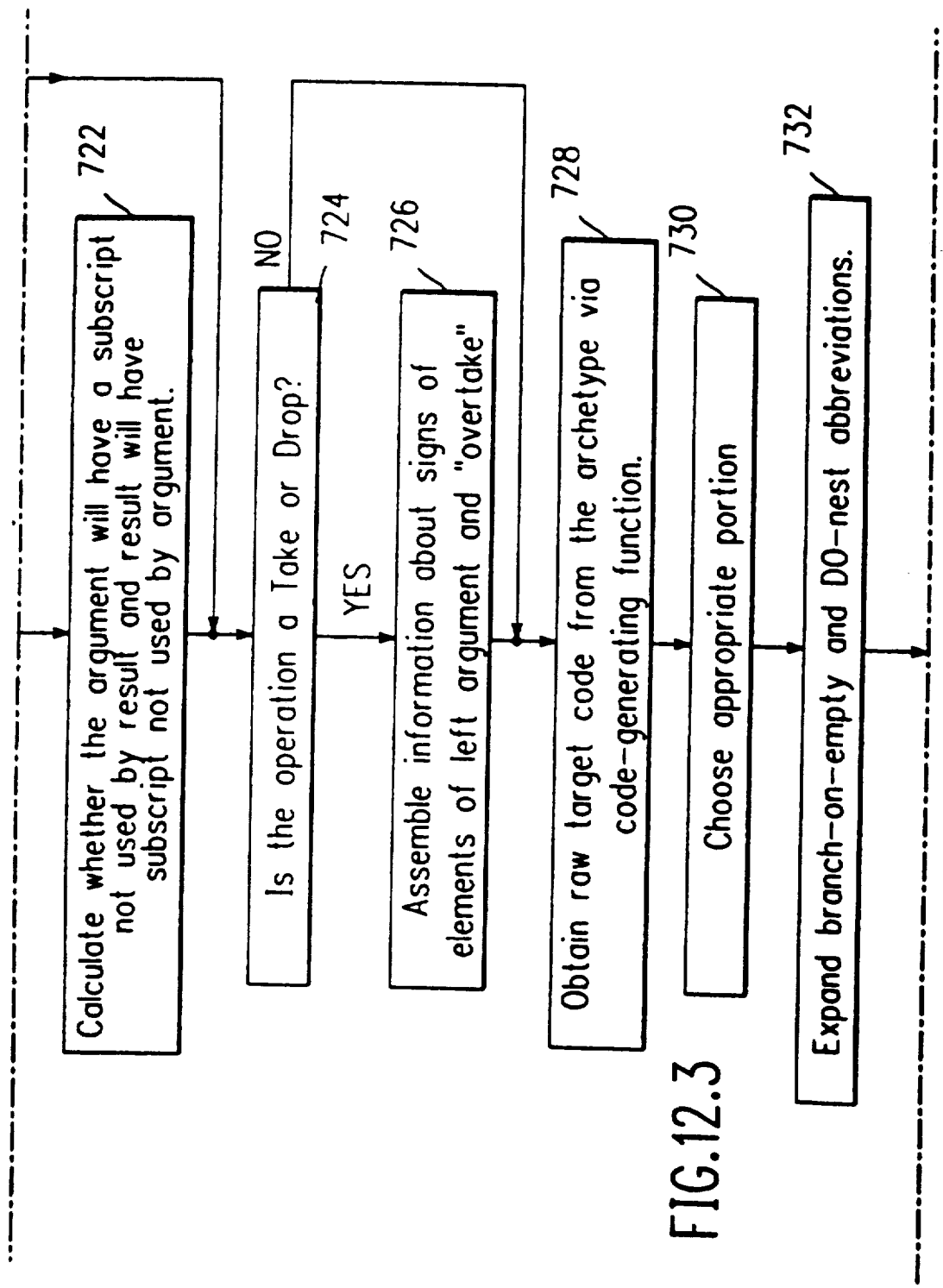
FIG.12.3

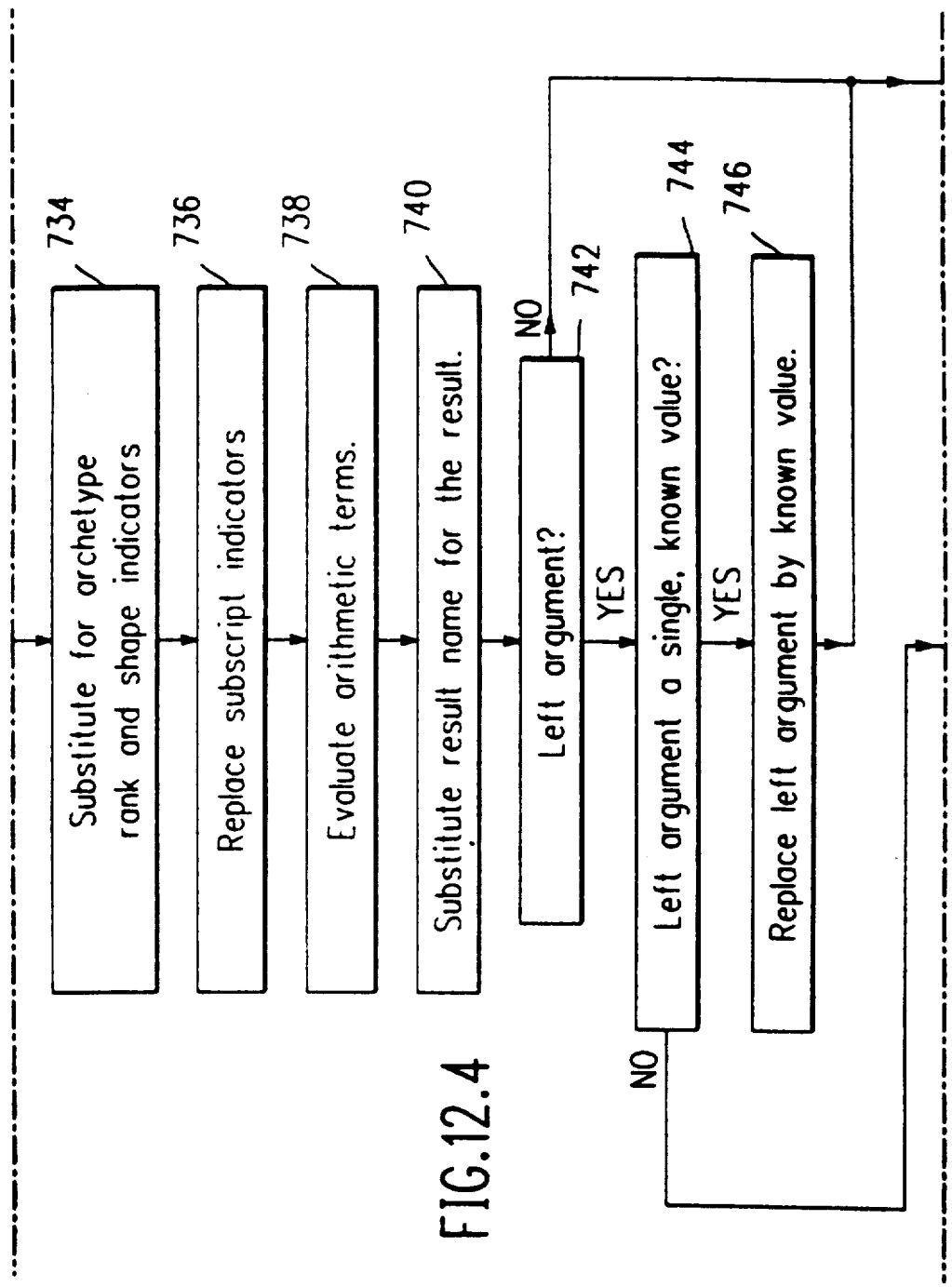
FIG.12.4

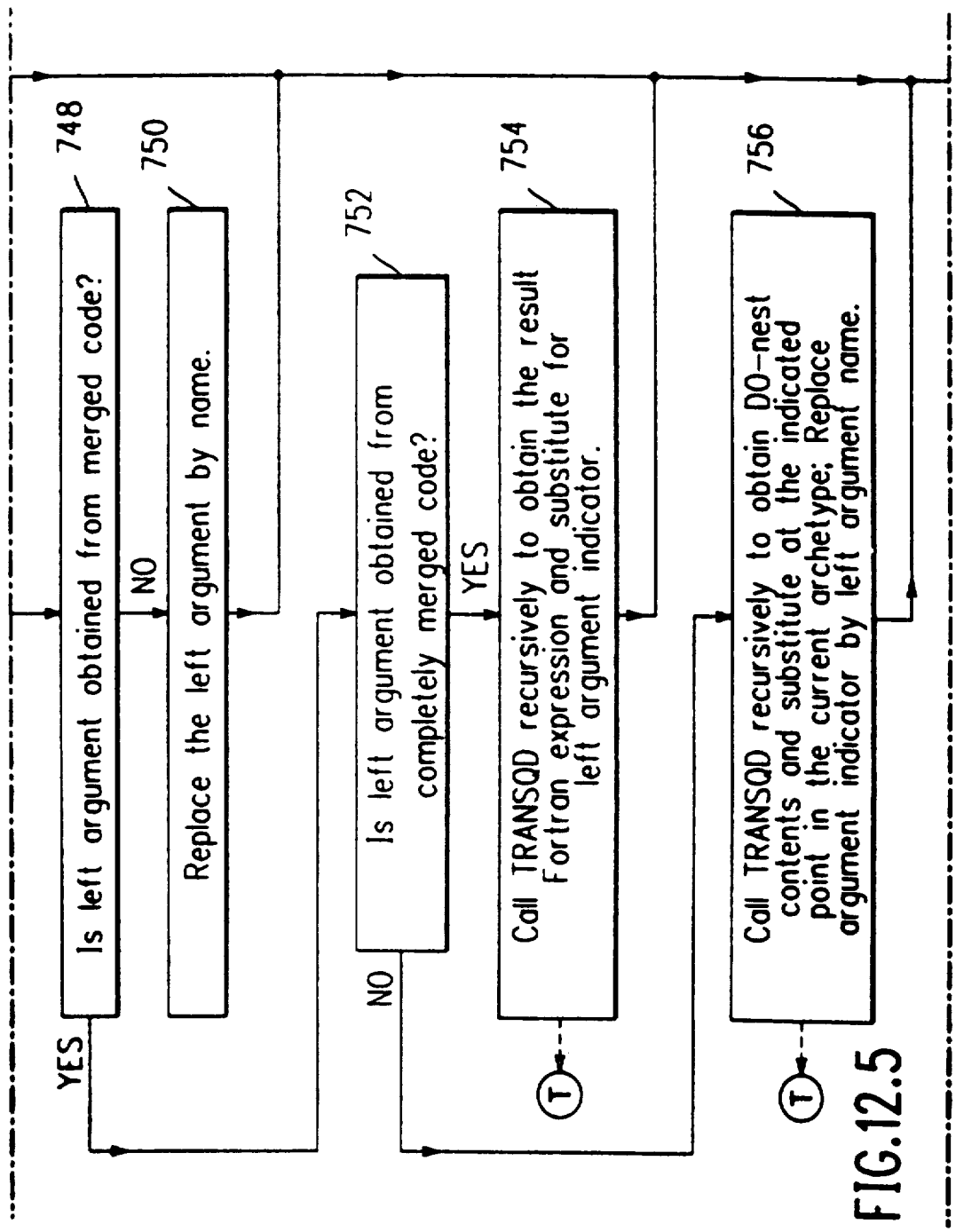
FIG.12.5

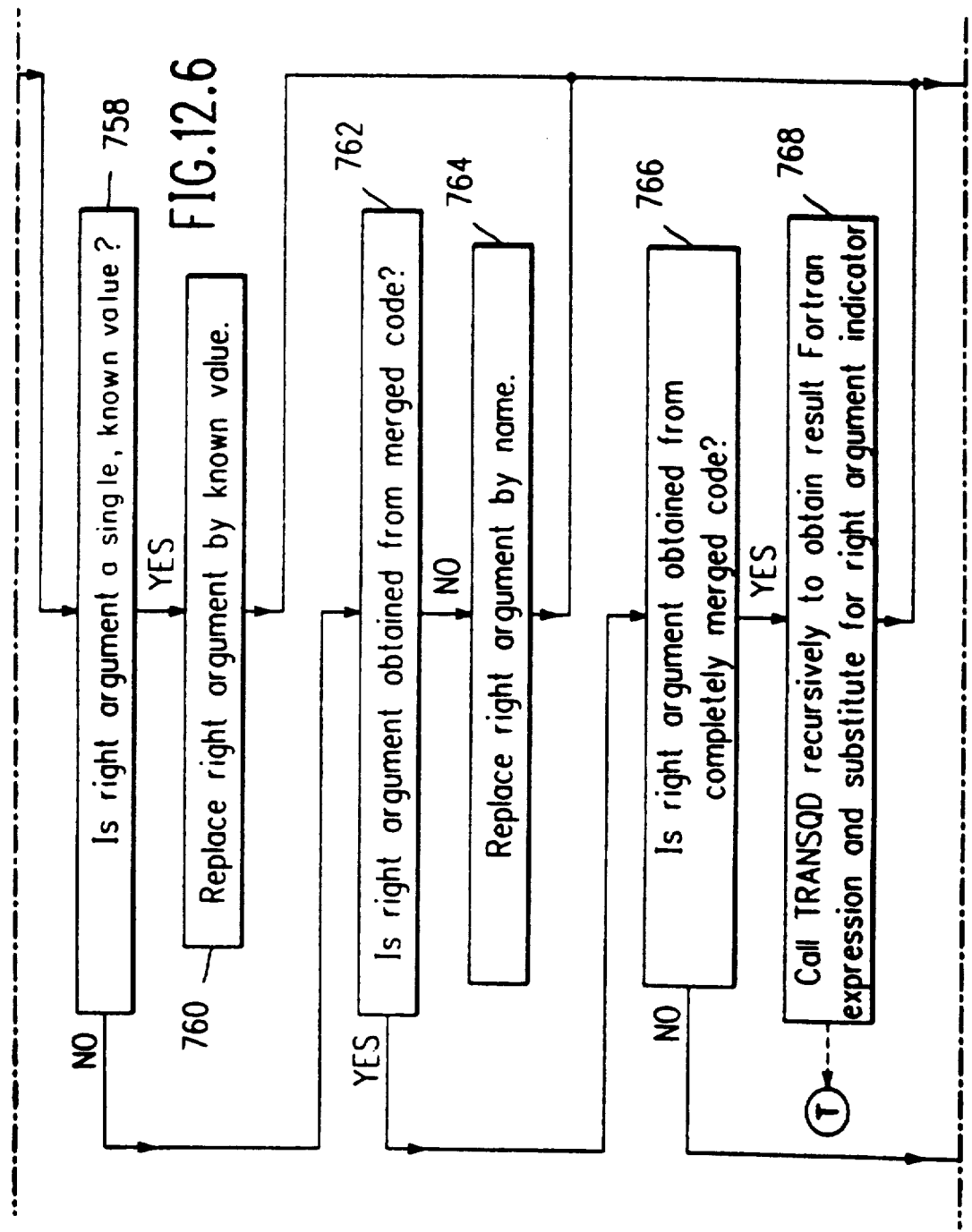

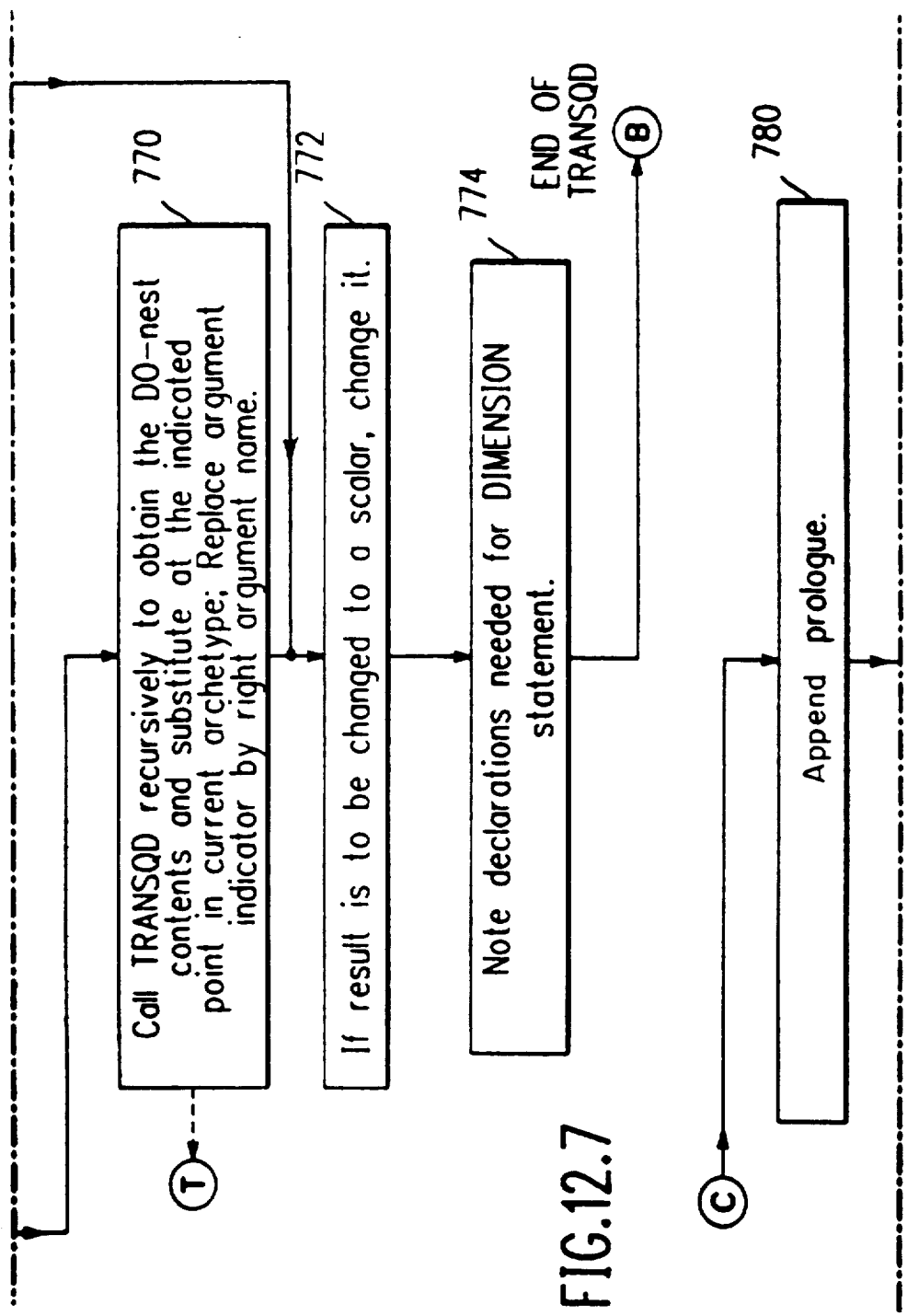
FIG.12.7

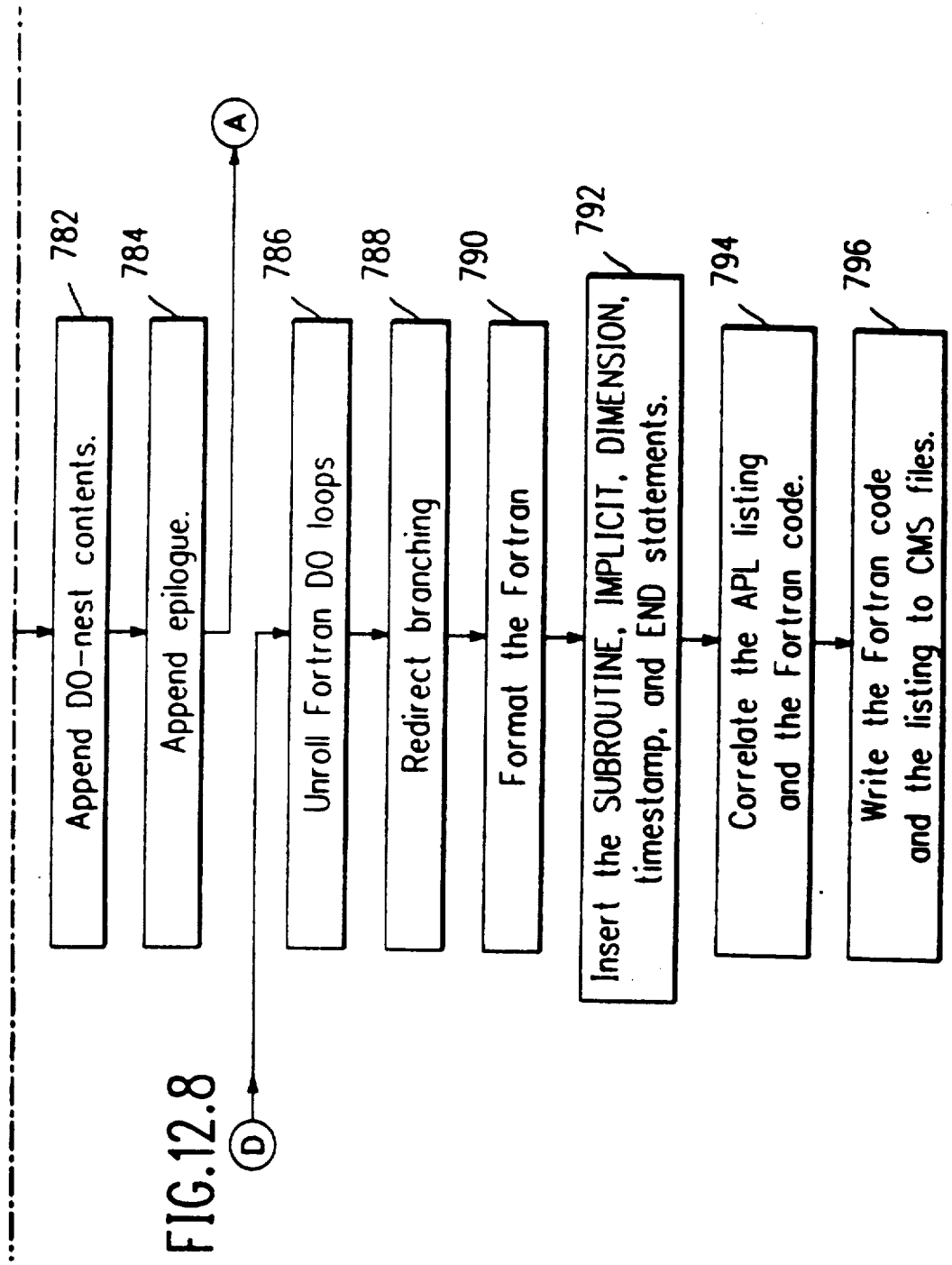
FIG.12.8

APL-TO-FORTRAN TRANSLATORS

This is a continuation of application Ser. No. 06/882,737, filed Jul. 7, 1986, now abandoned.

FIELD OF THE INVENTION

The present invention relates to a method of translating computer code in a source language, such as APL, into code in a target language, such as FORTRAN.

BACKGROUND OF THE INVENTION

APL (an acronym for A Programming Language) is a computer programming language based on a varied set of predefined functions referred to as "primitive functions". A primitive function may be viewed as a function which corresponds to a single character on an APL keyboard or an "operator" applied to such a character, Some primitive functions represent fundamental mathematical operators (such as addition, subtraction, raising a number to a power, and the like). Other primitive functions involve logical operations, matrix operations, and data assignment operations. Primitive functions perform various operations ranging from reordering lists numerically or alphabetically, to changing a scalar value to a vector, to restructuring a matrix or array, or displaying specified information—operations or functions useful in business, scientific, and character processing applications. A list of primitive functions and explanations thereof are set forth in a publication entitled *APL—360 Primer*, Third Edition, (IBM Publication Number GH20-0689-2) written by Paul Berry, 1971. Detailed description of the APL language is also provided in *APL An Interation Approach*, Second Edition, by Leonard Gilman and Allen Rose, John Wiley and Sons, Inc., 1974. Additional information on APL language for users of APL Systems is found in *Systems—APL Language*, Sixth Edition, (IBM Publication Number GC26-3847-5), 1983, and the principles underlying its development are given in a paper by A. D. Falkoff and K. E. Iversion entitled "The Design of APL", IBM Journal of Research and Development, Vol. 17, No. 4, Jul., 1973.

Primitive functions are typically characterized by a valence which suggests the number of arguments on which the primitive function is to operate. When a primitive function operates on just one argument, it is styled as "Monadic". When a primitive function is to operate on two arguments, the primitive function is referred to as ∓Dyadic". In Monadic form, the argument is positioned to the right of the symbol representing the primitive function. In Dyadic form, one argument is positioned to the left and the other argument is positioned to the right of the primitive function symbol.

Oftentimes the same APL primitive function has a Monadic meaning and a Dyadic meaning. For example, the Greek letter iota ($\iota$) when applied to only one argument represents an "index" function. The index function $\iota n$ defines a string of numbers starting with one and incrementing up to the value n. $\iota 5$ then corresponds to 1 2 3 4 5. When $\iota$ is preceded and followed by an argument, it is Dyadic and represents an "indexing" or "ranking" function. That is, the Dyadic $\iota$ is used to determine where, in the array of the left argument each element of the right argument is positioned. For example, if X is a vector including the alphabet with "A" being in the first position, "B" being the second position, etc., the expression X $\iota$'ABACUS' would yield a result 1 2 1 3 21 19. Similarly, 1 3 $\iota$3 1 1 would yield a result 2 1 1 (where "3" is in the second position of the left argument.)

Some functions are derived from the primitive functions and are available in the APL language. These derived functions are typically formed from primitive functions (including operators) and may involve several operations. For example, +/ represents a derived function wherein at all values to the right thereof are summed. Other derived functions include matrix products and the like, wherein matrix elements may undergo several functions—such as multiplication and summation—before the desired result is evaluated. Primitive functions and derived functions are hereinafter referred to collectively as "basic functions".

The arguments that are operated on may be of several types: integer, real, complex, Boolean, or (alphanumeric) characters, for example. Each argument is also characterized in terms of its "rank" and "shape". "Rank" represents the n umber of dimensions, or axes, in a data item; and "shape" reflects the number of elements along the various dimensions or axes. An argument may be in the form of a "scalar" having no dimensions and hence a rank of zero; a "vector" having one dimension and hence a rank of one; a "matrix" having two dimensions and hence a rank of two; or an array having more than two dimensions. For a vector, the shape corresponds to the number of elements in its single dimension; for a matrix, the shape corresponds to the number of rows and the number of columns; and for a larger array, the shape corresponds to the number of elements in the respective dimensions.

In APL programming, primitive functions and derived functions may be used by themselves to perform desired operations or may serve as building blocks that can be combined by a programmer to form user-defined functions. When a user defines a function, it may be "called" in the same way that a primitive function or derived function is. That is, by specifying arguments (as required) and including an appropriate reference to the function, the user-defined function may be executed as if it were a primitive function or derived function.

At this point is it noted that APL has two distinct modes. In a definitional mode, the user can form his (or her) own definitions or functions. When in the definitional mode, the computer operates to store the entered definitions or function. The second mode is an execution mode in which expressions (including primitive functions, derived functions, or defined functions together with arguments and parameters therefor) are processed by the computer. When in the execution mode, the computer executes one expression (or instruction) after another as each line is entered by the user. The result is then immediately communicated to the user.

The defining of customized functions by the user and the immediate execution of expressions represent significant attractive features of APL. Because the user interacts with the computer system, the user enjoys great flexibility in revising and re-directing his (or her) computer program as results are returned and is able to stop his (or her) program at a desired point to enter data.

Another significant aspect of APL is that the language per se does not distinguish variables based on types or internal representations. For example, from the language itself, it cannot be determined whether a variable is an integer or a real number; however the internal representation and processing of each within the computer is quite different. Instead, type (and internal representation) is inferred from use. Moreover, the type of a given variable may change from time to time during an application program; however, although the change is recognized by the computer the change is not manifested in the programming code. While facilitating the writing of code is APL, the lack of differentiation between variable types and the changing of variables from one type to another result in a dynamic instability which makes the tracking of variables in a translation process difficult.

The dynamic, potentially unstable nature of APL objects has prompted most APL implementations to be interpretive in nature. An "interpreter" seeks to execute code directly without any intermediate language, typically performing syntax analysis and argument-conformability and domain checking on every execution of an APL statement or expression. By executing sequentially, the interpreter need not consider how a variable may have changed in type. It is the current status of variables—as determined by earlier executed instructions—which need be considered.

A significant problem with interpretation is a considerably high overhead in execution and storage costs, especially for statements involving arguments that include few elements. Hence, for a number of years, efforts have been made to overcome such inherent performance limitations of APL interpretation.

An alternative to interpretation is translation or complication. In a general sense, the term "translator" in computer science parlance means a program which transforms software from one computer language to another. A "high level APL translator" thus means a program which transforms all or some code in an APL application into code in a high level computer language, such as FORTRAN. Although sometimes assigned a broader scope, the term "compiler" is normally applied to a translator that prepares machine language code from code written in a higher level language. For purposes of this description, the terms "translation" and "compilation" are used to accordance with the definitions set forth hereinabove. In further defining compilation, it is noted that if APL is transformed directly to machine language form, that is clearly compilation. Moreover, if APL is first transformed to a language such as FORTRAN by a high level translator and the resulting FORTRAN is transformed to machine code by a FORTRAN compiler, this total process of reforming the APL into machine language form is compilation also.

In the past, compiling APL has typically involved the examining of APL code with the APL statement being the unit of compilation. Such one-statement-at-a-time compiling results in a weak form of static analysis. This shortcoming may be overcome by use of declarations in which the user sends informational messages to the computer; however, the required number of declarations for the statement-by-statement approach is impractically large.

High level translators of the prior technology generally define the APL function (rather than the APL statement) as the unit of translation. However, most of these high level translators do not include a rank and storage type analysis and perform little or no static analysis. Consequently, prior art high level translators either produce such general code as to provide little advantage, if any, over APL interpreters or severely limit the subset of APL operations or functions that can be translated. Such limitations have made it difficult to partition APL applications into sections to be translated and sections to be interpreted. Moreover, the generality of such approaches have normally required the user to include numerous declarations.

Notwithstanding the widespread use of APL in varied applications and the numerous continued efforts in enhancing the processing of APL programs by translation (e.g., compiling or high level translating) rather than interpreting, no overall satisfactory approach has been suggested by the prior art.

Some references in the prior technology discuss APL translation, including compilation. Such prior technology fails to adequately account for the various cases which can apply to the APL primitive functions and derived functions or fail to overcome the difficulty of translating variables which the language does not distinguish based on type (i.e., internal representation). Moreover, the prior art does not provide methodology for deriving shape information—which severely limits translation or compilation.

The following U.S. Patents relate to computer program translation in general. U.S. Pat. No. 4,374,408 discloses a multi-pass system for translating an RPG program to COBOL. U.S. Pat. No. 4,309,756 discloses a method of automatically evaluating source language logic condition sets and compiling machine executable instructions directly therefrom. These patent references are cited as of background interest.

SUMMARY OF THE INVENTION

The present invention is directed to a method of effectively translating code that is written in a source language having attributes of APL into a target language. Such attributes include (A) having arrays as primitive objects thereof, (B) having primitive functions which are applicable to arrays, (C) having primitive functions in which internal representations are inferred from use, and (D) having primitive functions which are applied differently in different cases.

Such translation may be employed in several environments. A first environment relates to a compiler context. Given a program written in APL (or a language with similar attributes), processing time and storage requirements may be improved if the code is compiled rather than interpreted. Compilation may be treated as a two-step procedure: (1) reducing the source code to scalar form (such as FORTRAN) with explicit looping being used in place of array operations (performed in APL) and (2) transforming the scalar form to machine code. The latter step is accomplished by a conventional (FORTRAN) compiler that, preferably, produces highly efficient machine code. The former step is accomplished by the translator of the present invention.

When used in a compiler, the present translator overcomes problems and shortcomings attending prior methodologies of compiling APL or similar code. The present translator addresses the problem of generating code for primitive functions which provide for different operations at different times by employing case-dependent archetypes. Each archetype is associated with a respective primitive function and provides corresponding code for the various different cases that may be required by a primitive function. Conditions and selection indicators incorporated into the archetype permit selection of code based on the applicable case for the archetype.

A significant benefit of archetype use over prior techniques involves the ease with which modifications to the translator may be made. Rather than requiring the changing of various inter-related rules in order to modify the translation of a simple expression as with prior approaches, the present translator enables the user to modify translation by just modifying an appropriate archetype.

It is further noted that the archetypes are of a general nature. Accordingly, the archetypes used for translating APL to FORTRAN, for example, may also be used, with minor modifications apparent to anyone skilled in the art, in translating from APL to a high level language other than FORTRAN. In addition, to improve compiler performance, the present invention combines source language code which, when translated into target language, results in more efficient processing of the target language code. The combining or merging of source language code includes the steps of: (a) restructuring the source language code as a sequence of simple source language expressions; (b) determining how far each expression can be moved based on information derived during static analysis; (c) and merging source language code according to "use" or "similarity". Under certain predefined conditions, a subject simple expression may be moved and merged to any point in the application without cast. Such unrestricted merger by use is detected during a first pass. In other instances, an APL expression may be merged only with code positioned within a "basic block" of re-structured code. A "basic block" starts and ends with a label statement or a branch with no label statement or branches in between. Such limited merger by use is also performed based on passes through the application. Merger by use serves to improve execution a speed and to reduce necessary storage.

In merger by similarity, a simple source expression indicating a scalar function, simple specification, or type change having a non-scalar result can be merged with another simple expression of the same nature and in the same basic block provided that the results of the two expressions have the same shape. Merger by similarity saves execution time. Merger is intended to reduce computational overhead by reducing the number of DO nests int he target language code and by reducing storage for intermediate arrays. However, excessive merger can detract from the clarity of the target language code. Moreover, with excessive merger, the number of machine registers available may be found to be insufficient for the degree of merger, —the storing and loading of registers resulting in reduced execution speed and the introduction of other inefficiencies. At times it is thus desirable that merger not be performed or that the number of simple expressions allowed to be merged be limited. Accordingly, the present invention features a variable control (referred to as COMBINE) which sets the maximum number of simple expressions which may be combined. The COMBINE control preferably enables the user to control the degree of permitted combining in various respects.

The combining of simple expressions may affect cache misses and page faults during the execution of the ultimate running code. By comparing running times with various COMBINE settings, the effect may be evaluated.

Also in accordance with the present invention, the combining of code and the selection of elements of archetypes depends on information derived from the original source language code during statis analysis. The static analysis generates rank, type, and shape information for arrays; determines how far a simple expression may be moved; and generates labels to be applied to target language code variables derived from the source language code. Of particular significance, the state analysis includes a shape analysis in which shape arrays are identified, shape array element variables are assigned, equivalence classes of element variables are built, a representative of each equivalence class is selected, and simple statements for each class representative are built. The simple statements replace prior shape computations. The shape analysis involves an algorithm which—based on declarations regarding shape, shape upper and lower bounds, and other derived information—determines (a) which array shapes must be computed during program execution and (b) how such array shapes must be computed.

Also in accordance with the invention, it is presumed that the original source language code to be translated is correct, i.e. has been de-bugged. Hence, overhead associated with runtime domain checking is reduced or, if desired, eliminated.

As an alternative to the compiler environment, the desired end off the user may be code in the target language. A user may be programming in FORTRAN but a portion of the application may be more readily written in a language having the attributes of APL. The present invention permits the user to write such portions in APL (or in a language with similar attributes) and to have such portions translated into corresponding code in a second high level language to be incorporated with other portions of an application written in the second language. The invention thus enables the user to write all or part of an application in a language (such as APL) while permitting processing to be more efficiently performed on corresponding code in another language (such as FORTRAN).

For user convenience, a correlation between source language code statement numbers and target language code statement numbers is included.

In either environment, the user can modify the final machine code by altering the original source language code or the target language code.

To achieve the object of improving code processing performance, the present translator recognizes features which, when present in a program of source language code, suggest that translation cannot be performed or that translation would result in more complicated or perhaps more time-consuming processing. In this event, the original source code is not translated and remains intact to be interpreted conventionally in line-by-line fashion. Accordingly, programs which are processed more efficiently via translation are translated, while those which yield no benefit from translation are left unchanged for interpretation. A compiler including the present invention accounts for all source language constructs.

The present translator and method therefore achieve the object of improving the performance characteristics of APL applications by improving the performance characteristics of a large but restricted class of APL programs.

BRIEF DESCRIPTION OF THE DRAWINGS

FIGS. 4.1, 4.2 and 4.3 are a flowchart illustrating the static analysis performed by the present invention prior to code generation.

FIGS. 6 through 9 illustrates a shape analysis example. In FIG. 6, the possible effects of a TAKE function on an array are shown. In FIG. 7, the analysis of a particular complex expression involving several TAKE functions is shown in detail. In FIG. 8 and FIG. 9, two results of the analysis of FIG. 7 are shown depending on how much information is known.

FIG. 11 which includes FIGS. 11.1, 11.2, 11.3, 11.4, 11.5, 11.6 and 11.7 are a detailed flowchart illustrating how code is merged or combined.

FIG. 12 which includes FIGS. 12.1, 12.2, 12.3, 12.4, 12.5, 12.6, 12.7 and 12.8 are a detailed flowchart illustrating how code is generated.

DESCRIPTION OF THE INVENTION

I. General Description of the Invention

Figure 1:
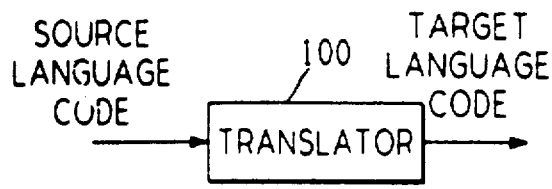
FIG. 1 is a simple flowchart for a computer language translator.

In FIG. 1, a general block diagram of a computer program translator 100 is illustrated. The translator 100 receives source language code as input and produces corresponding code in a target language.

Figure 2:
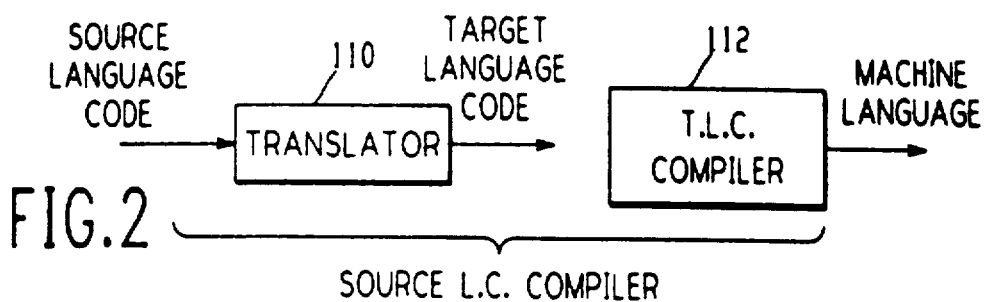
FIG. 2 is a simple diagram of a source language code compiler.

A computer program translator may be used in a number of different environments. A first environment is set forth in FIG. 2. In FIG. 2, it is desired to convert code in a source language into code that a machine can process directly. The conversion of code from a higher level language to machine language code is generally referred to as "compiling". In FIG. 2, the compiling operation is shown to include two stages. First, a translator 110 transforms source language code into code in a target language. The target language has a pre-existing, efficient compiler 112 of its own. The two-stage process is particularly useful for source languages, like APL, which are notably difficult to compile directly (in one step). For purposes of context and, in describing a specific embodiment, the present invention is discussed with APL as the source language and FORTRAN as the target language.

For APL as the source language, it is observed that the translator 110 converts APL code into a scalar from (e.g., FORTRAN in this embodiment). At this point it should be noted that APL is intended to refer to code which conforms to the IBM internal standard of APL as published in "The Development of an APL Standard" by A. Falkoff and D. L. Orth in an IBM Thomas J. Watson Research Center Publication RC 7542 (1979). The term APL generically applies to APL2 Release 2, VSAPL, and other APL forms. Similarly, FORTRAN is intended to extent to various compliable forms—such as VSFORTRAN, FORTRANG, FORTRANH, and the like. See VS FORTRAN Language and Library Reference, IBM Publication SC26-4119. VS FORTRAN is an extension of FORTRAN 77 which is embodied in industry standards. American National Standard Programming Language FORTRAN, ANSI X3.9-1978.

After the APL code is translated (as in FIG. 2), the target language is passed through any of various known FORTRAN compilers. The two-stage approach to APL compilation enables the users to process APL code while overcoming disadvantages attending the expression-by-expression execution of APL interpreters.

In a second environment, a user may desire an application in FORTRAN. All or a portion of the functions to be performed may, however, be more easily written in APL. In this environment, the present translator may be used to simply convert code originally written in APL into FORTRAN.

That is, either a program or an application may be transformed from APL to FORTRAN—the final form.

The distinction between the environments in twofold: (1) whether the APL or the FORTRAN is regarded as the source and documentation language, and (2), the crucial point, whether the complied FORTRAN translation will be called at execution time from an APL function, i.e., by the APL interpreter, or will be called from a FORTRAN main program (the translations then being subroutines). In either case, the FORTRAN is at some point compiled.

Figure 3:
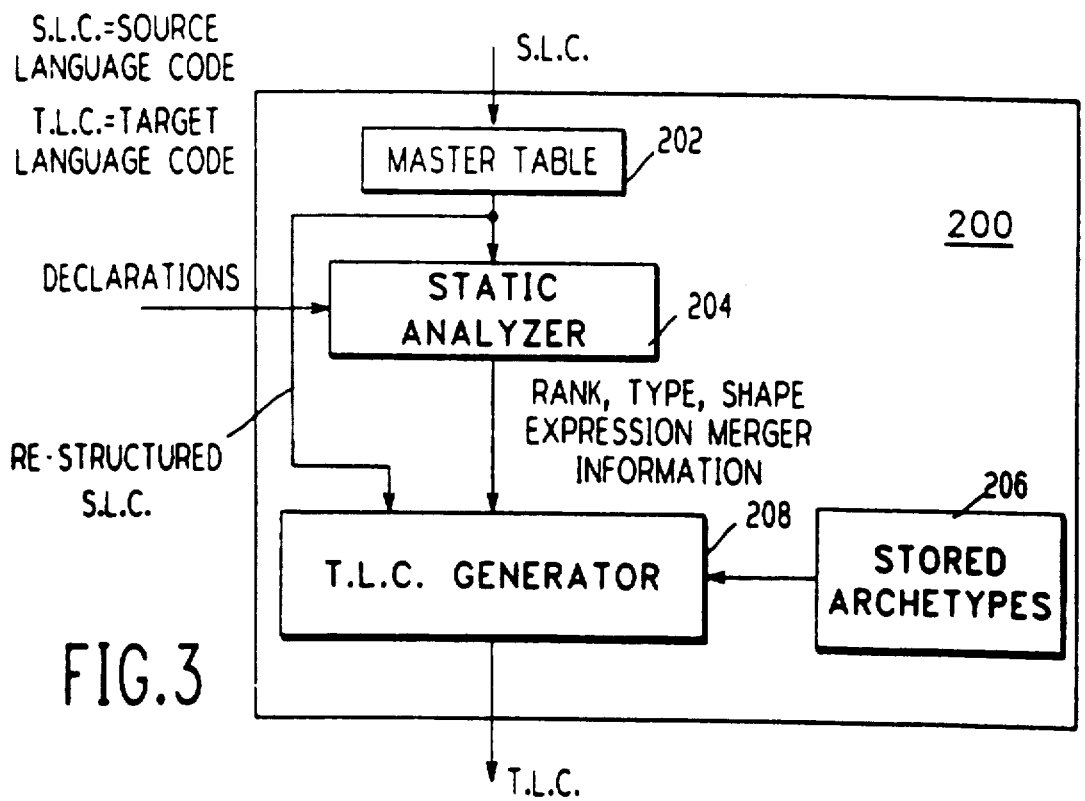
FIG. 3 is a diagram generally illustrating the apparatus of the invention.

Referring now to FIG. 3, a translator 200 includes several major elements. Source language code is restructured, for each program, into a sequence of simple APL expressions which are stored in a master table 202. A simple expression may correspond to a primitive function (e.g. a function or an operator), a derived function (such as the reduction functions), an idiom (discussed hereinbelow), or a user-defined function. Each of these functions may be typically characterized as including one or two arguments, an operator for function, and a result. When a simple expression in a first master table corresponds to a user-defined function, a "call" reference is made in the first master table. Such a reference indicates that a second master table corresponding to the program for the user-defined function must be "called". In this way, programs are broken down to basic functions.

The term "idiom" is commonly used to describe an APL expression, usually containing several functions, that appears frequently in APL programs and that has a meaning which can be expressed without reference to its components. Three examples are $\rho\rho V$, (LIST[;$\iota$-$\rho$ITEM]$\wedge$.=ITEM)$\iota$1. and $((V\iota V)=\iota\rho V)/V$. The result of the first of these idioms is the rank of V. In the present invention, the idiom is not handled literally, by computing the shape of the shape of V; rather, in the analysis the actual of V (a known constant) is substituted for this expression. The second idiom yields the row of the matrix LIST in the beginning of which the vector ITEM appears. In the present invention, the shape function, the Monadic Iota, the indexing, the inner product, and the Dyadic Iota are all merged, and the resulting FORTRAN code is essentially what one would produce if one were to write code especially for this idiom. Merging produces excellent code for many idioms. The third idiom compresses (shortens) V by retaining only the first instance of any given value and discarding duplicates. While it is not provided for specifically in this invention, it is an example of a candidate for special handling using a technique that is already employed in the invention for some other useful idioms. This technique consists simply of assigning a symbol number to the idiom and writing a corresponding "archetype, or assigning to the idiom an existing symbol number and a new flag number (i.e., a flag number otherwise unused for this symbol) and writing a corresponding addition to the archetype for the symbol. The idiom is then recognized during analysis and a simple expression is generated for it using the special symbol number or symbol number and flag, so that the idiomatic archetype or portion of an archetype will be used during code generation. An idiom may have more than two arguments, but that is really also true of Indexing and Indexed Specification. According to the invention, in the position where an argument number normally appears there can appear the number of a variable whose value is a list of argument numbers.

At this point, it is noted that the "compilation (or translation) unit" is the program and that the user can initially indicate which programs—in a set of programs in an application—he or she wants translated. The present invention then, as discussed hereinbelow, determines if translation is possible and practical and if (and what) information should be supplied by the user through declarations.

The re-structured code of the master table 202 and declarations (which are user statements that provide information to the translator 200) enter a static analyzer 204. The static analyzer 204 performs a number of passes through the master table (one program at a time) and derives rank, type, and shape information relating to arrays included in the program being processed. Information regarding which expressions in the master table can be combined and how far an expression may be moved in the master table is also derived. Other information, as discussed hereinbelow, which also aids in facilitating the translating procedure is also derived.

The re-structured APL code and the information (and attributes) derived therefor are applied to stored archetypes 206 by a target language generator 208. Each stored archetype includes code representative of target language code associated with a corresponding primitive function or derived function. For each particular primitive function or derived function occurring in the master table, that is thus a corresponding archetype. To account for the various cases applicable to each primitive function or derived function, each archetype includes (a) appropriate conditions and (b) portions of code which can be selectively generated for each based on the resolution of conditions. Based on information derived by the static analyzer 204 or supplied by the user through declarations, the target language code generator 208 selects, or generates, appropriate target language code from the archetypes. The target language code generator 208 also refines the selected code and provides the refined product as output.

Procedures for forming master table are set forth in prior literature which discusses syntax analysis for programming language compilers. The flowchart of FIG. 4 sets forth preferred steps performed in constructing the master table and steps in performing the static analysis.

At step 300, the list of programs to be translated is initialized. This initialization is prompted by the user identifying those programs for which translation is sought. Thereafter, at step 302, a decision is made as to whether any programs remain to be processed. If yes, the next program is processed beginning with a syntax analysis transforms the program being processed into a sequence of simple APL expressions of the form:

Result(Variable) Argument(Variable) Function Argument(Variable)

For example, a simple expression for adding A1 to A2 to give the sum A3 would be stored as:

| Result | Argument | Function | Argument |
|--------|----------|----------|----------|
| A3     | A1       | +        | A2       |

The term function refers to primitive APL function, derived function, or user-defined function. If the function is a user-defined APL function and that name is not on the list of programs to be translated, the name thereof is appended to the program list.

In step 306, a branch expression analysis is performed. In order to avoid potential degradation in analyzing APL programs, branch expressions are limited to those whose branch targets can be determined during syntax analysis. Branch targets must be labels, 0, 1, or empty; must be visible; and must be in an acceptable form based on pre-defined idioms and a general accepted form.

Program processing ends with a global variable analysis 308. In this step, all parameters to the program (including global variables) are arranged in a list which can be conveniently referenced during the processing of other programs in the program list.

When no programs remain to be processed (step 302), a function call graph is constructed.

In step 312, the program list is ordered so that a "calling" program always precedes a "called" program.

Once the call graph is complete, an interprocedural analysis is performed to resolve all uses and specifications of global variables, after which the application workspace is no longer needed. In step 314, a global variable in a function called by a subject function is listed as a global variable of the subject function as well, unless the variable is specified as local in the subject program.

Data flow graphs and use-def chains are built in step 316. "use-def chains" in effect represent links between variable definitions in a program and uses of the variable. That is, after a program is partitioned into "basic blocks" (as defined hereinbelow), the use-def chains determine in which basic blocks a variable is set and in which blocks the variable is used.

Following step 316 are steps involving constant parameter analysis 318 and constant propagation 320. In accordance with the constant parameter analysis 318, each time a function call is encountered, constant parameters (either explicit or global) in the call and their values are noted. If the constants match those in a version of the called function which has been previously encountered, that version is used in the call. Otherwise, a new version of the called function is made with the constant parameters and the new version is used in the call.

In step 322, the programs are processed in the order of the program list and the simple expressions it each program are processed in their order of appearance in the program's master table. In this forward processing, rank and type information is inferred for result variables of simple expressions. also in step 322, programs are processed in the reverse order of the program list and the simple expressions therein are processed in the reverse order of their appearances. In this backward processing, rank and type information is inferred for argument variables of simple expressions. If any inferred information changes after the start of the forward processing, the forward processing is re-started and step 322 is repeated.

Still referring to step 322, it is observed that the attributes of variables are storage-type, rank, and length (for vectors). For each argument variable of a simple expression being processed, attributes are determined by merging the attributes—as they are currently known—of all result variables of simple expressions in which such argument variable is set. If the function in the simple expression currently being processed is an APL primitive function or a derived function, then the attributes of the result variable are determined from (i) the attributes of the argument variables as those attributes were just computed and (ii) the format properties of APL primitive and derived functions.

If the function is the name of a user-defined function, the version of the function is sought in which the attributes of the parameters match the argument variables as just computed. The selected versions is used in the call and the attributes of the result in that version—as they are currently known—are used as the attributes of the result variable. If not version of the call function matches, a new version is constructed and used in the call.

In the backward inference of argument variables of simple expressions (in step 322), the argument variables are determined in the same manner outlined hereinabove for result variables.

In the past, general algorithms for determining rank and storage type have been proposed for various programming languages. The present invention contemplates the use of such known algorithms in determining such information. However, the prior technology does not discuss or suggest methodology for analyzing shapes of matrices and other arrays that are used in languages such as APL.

Figure 5:
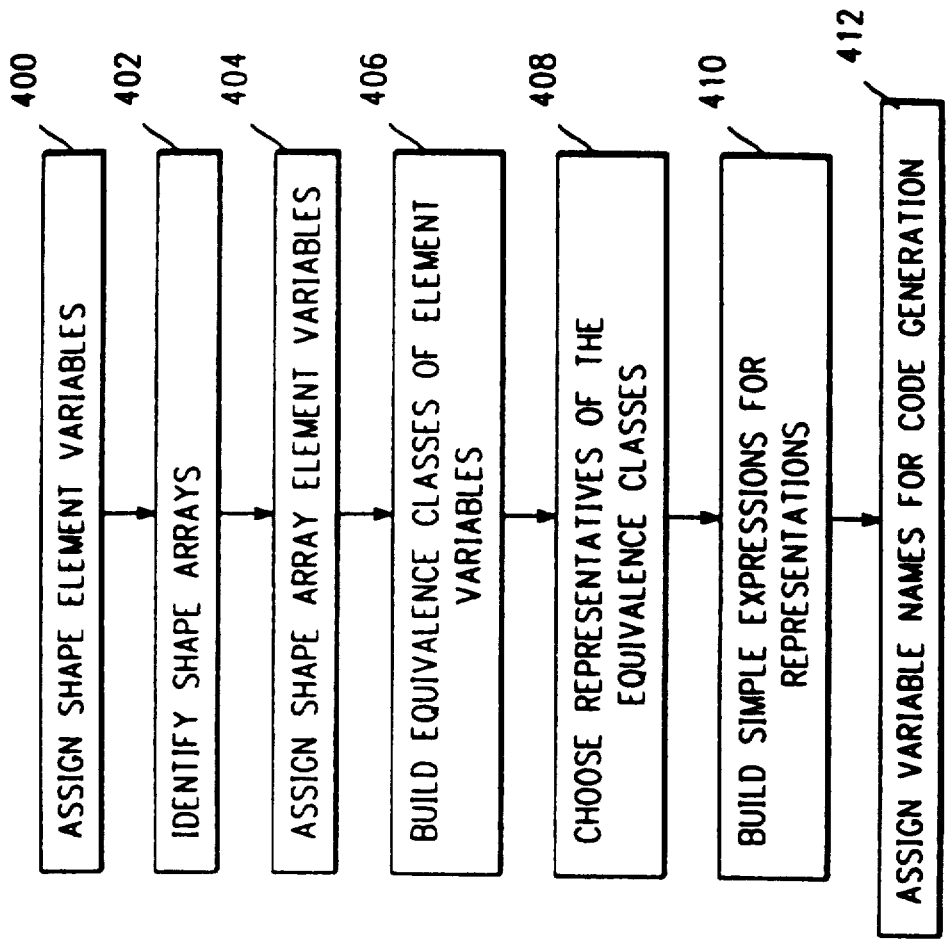
FIG. 5 is a flowchart illustrating the shape analysis performed in the static analysis of FIG. 4.

As elaborated hereinbelow with regard to FIG. 5, the present invention includes new methods of collecting and arranging data corresponding to shape (step 324 of FIG. 4). Briefly, for subject array, a variable is assigned to each axis or element of the array as shown in step 400 of FIG. 5. It may be that other arrays may contain information regarding the shape of the subject array. These arrays are identified (step 402) and, in step 404, a variable is assigned to each element of an information-carrying array. Relationship between the variables. Based on the relationship information, element variables of the same value are noted and included in classes of equivalents (step 406). The formal definitions of APL primitive functions and derived function are used to determine identical variables. For each equivalent class, a representative variable is selected—preferably the variable in the class which occurs first in the program execution (step 408). Thereafter, a simple expression is built for each representative in step 410. These simple expressions are the only shape computations needed. The expressions are then inserted into the program unit currently being analyzed and the original shape computations in the program unit are deleted. Thereafter, names are assigned to all remaining variables in step 412.

The shape information is later used to determine storage requirements, to determine parameters of target language (FORTRAN) DIMENSION statements, and to resolve conditions for archetypes (discussed in greater detail hereinbelow) in the code generation step.

Figure 6:
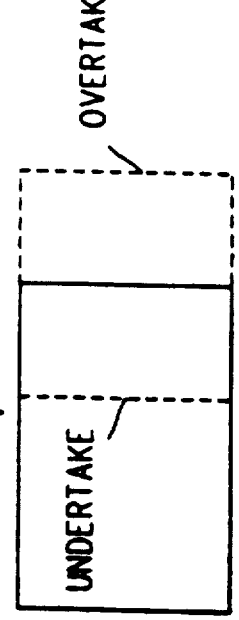

By way of example, FIG. 6 through FIG. 9 show how derived information is used in generating shape information based on an expression including the TAKE function. The TAKE function is represented by one argument preceding and one argument following a vertical arrow pointing upward. The latter argument corresponds to an array of any rank and the former argument indicates how much of the matrix or array is to be extracted from the matrix or array. For a matrix, one element of the first argument indicates how many rows and another element how many columns are to be extracted; a positive or negative value for an element in the first argument indicates whether the TAKE is from the left (top) or from the right (bottom). If the element indicating how many columns are to be taken in is less than the number of columns in the matrix, there is an "undertake". If, however, the element of the argument that corresponds to the number of columns exceeds the number of columns in the matrix, there is an "overtake". These cases are illustrated in FIG. 6. It is observed that code for implementing the TAKE function depends on which of the various above-mentioned cases apply: for example, is the TAKE form left (top) or right (bottom), and does "overtake" or "undertake" apply to rows and columns. The translation of the TAKE is, accordingly, difficult due to the various possible cases. The shape analysis is used to provide information that may be used to eliminate some of the cases based on existing or derived information.

Figure 7:
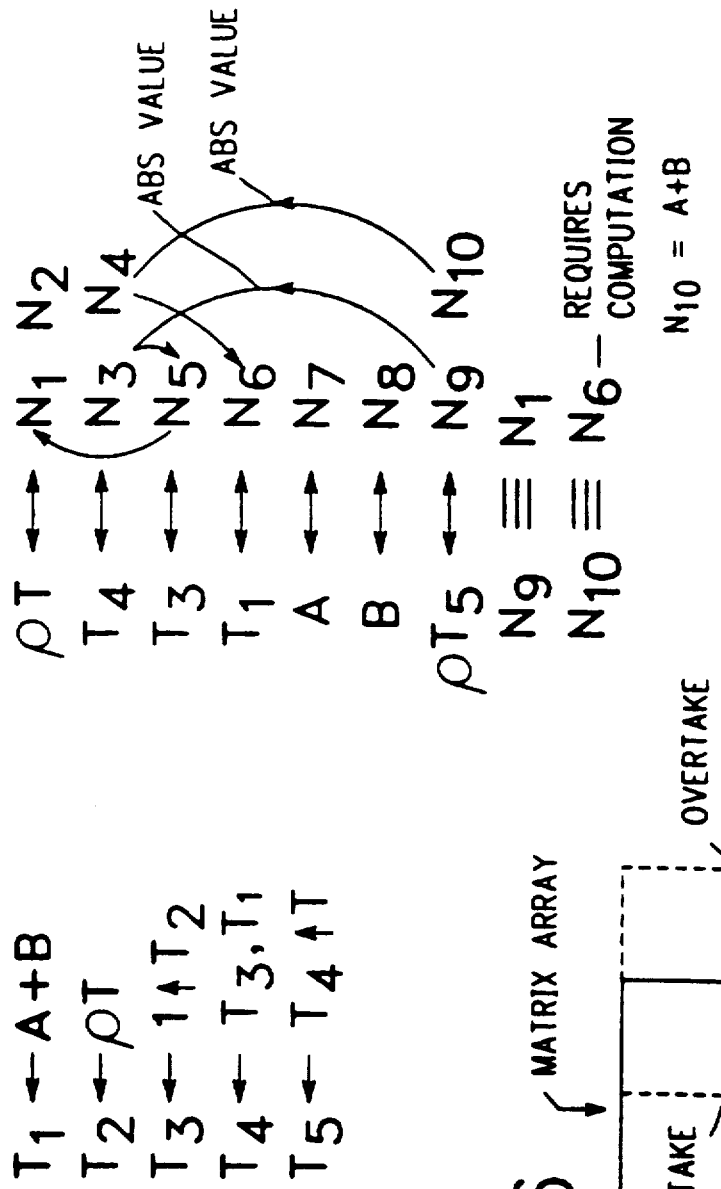

Referring to FIG. 7, a particular complex expression in APL is set forth. To understand what is intended by the statement, the left column lists the simple expression steps a conventional interpreter would follow. The sum of $A+B$ is assigned to the temporary variable $T_1$. The expression $\rho\,T$ is assigned to the temporary variable $T_2$. The third expression involves a TAKE having a left argument of 1 which is applied to the vector represented by $T_2$, the resulting being $T_3$. The temporary variables $T_3$ and $T_1$ are concatenated in the fourth expression to yield $T_4$. The interpreter then stores $T_5$ which is the TAKE having $T_4$ as the left argument and T as the right argument. The conventional interceptor would execute each expression in sequence to generate the desired result $T_5$. That is, each expression would be processed and its result temporarily stored for use in a later expression(s).

The present invention, however, uses rank and type information from step 322, and other known information to perform shape analysis. The rank, type, and shape information is later used in generating target language code (as described in greater detail hereinbelow).

In applying the shape analysis methodology of FIG. 5 to the complex expression of FIG. 7, it is noted that certain items of information should facilitate the later step of code generation. Is there an overtake? Is the TAKE from the left (top) or the right (bottom)? Are the "size" relationships which indicate storage requirements? These are useful items sought in the TAKE shape analysis. What is sought in particular is the shape of $T_5$, the result of the entire TAKE expression of FIG. 7.

It is assumed that the previous rank and type analysis (of step 322) indicates that T is a (two-dimensional) matrix. Because T has two axes, two shape element variables $N_1$ and $N_2$ are assigned to $\rho T$. The shape of $T_5$ is determined by the TAKE effectuated according to the left argument $T_4$. $T_4$ is identified as an array carrying shape information (step 402 in FIG. 5). It is known that $T_4$ is to have two variables assigned thereto because it reflects a rank-2 result. The two variables for $T_4$ are $N_3$ and $N_4$. Next, a variable is assigned to $T_3$ from which $T_4$ is determined. Because $T_3$ is simply a TAKE with a left argument of 1, it is known to have one element and is thus assigned one variable $N_5$. $T_1$ is the sum of two scalars A and B—which information is known from the prior rank and types analysis. Hence, only variable need to be assigned thereto, namely $N_6$. For each of A and B, there is assigned a respective variable $N_7$ and $N_8$. Finally, two variables are assigned to the two-dimensional matrix $\rho T_5$:$N_9$ and $N_{10}$. After the variables are assigned (pursuant to step 404 of FIG. 5), relationships between the listed variables are determined. It is first noted that $N_9$ is the same as $|N_3|$ and the $N_{10}$ is the same as $|N_4|$. In that it is known that $T_4$ is $T_3$, $T_1$, it is deduced that $T_4$ is $N_5N_6$. That is, $N_5$ matches up with $N_3$ and $N_6$ matches up with $N_4$. Further examination indicates that $T_3$ is simply a 1 TAKE of $T_2$ which is just $\rho T$. By performing the 1 TAKE of $\rho T_2$, it is noted that $N_5$ is the same as $N_1$. If it is known that $A+B$ is positive, equivalence among variables is traced back to indicate that $N_9$ is equivalent to $N_1$ and that $N_{10}$ is equivalent to $N_6$ which involves the computation of only $A+B$. The value of $N_1$—the shape element of T—was computed when T was computed as some previous time. Hence, $N_9$ need never be computed. When the value of $N_9$ is requested during code generation, the known value of $N_1$—the shape of T along its first axis—is provided. No further connections or relationships can be made from which equivalence classes can be determined (step 406 of FIG. 5).

In the above example, it is presumed that the sign of $(A+B)$ is known. If the sign is known (as presumed hereinabove), the result of the analysis is $N_{10}=A+B$ and $T_5=(N_1,N_{10}) \uparrow \%$. The parenthetical information is passed on to the code generator. In this case, both sign and shape information is communicated. This is shown in FIG. 8. This information is used to code generation by indicating that $N_{10}$ is positive and, hence, there is a positive TAKE—thereby eliminating the need to include code corresponding just to a negative TAKE.

In FIG. 9, the earlier presumption that the sign of $(A+B)$ is known is excluded. Under such conditions, $N_{10}=|N_6|$. Equivalence does not than track from $N_{10}$ to $N_6$.

The information forwarded for code generation is then $(N_1, N_6)$. In this case no sign information is passed, but shape information is communicated to facilitate target language code generation.

After the shape analysis (step 324 of FIG. 4), the master table is initialized with the simple expressions and attributes there of in step 326. Thereafter, at step 328, primitive function information is entered. This information includes distinguished axes; operand functions for operators; and how far code can be moved, if at all. The movement of code as noted hereinbelow depends on location branches and labels—which are used in defining "basic blocks" (described in greater detail hereinbelow).

In step 330, information—such as the following information—which pertains to variables is entered: storage type, rank, shape, names of variables where shapes are stored; code-generation names tentatively assigned; and whether the result of an expression is a temporary variable. This information, determined during static analysis, may be used in determining which expressions may be combined to reduce storage and reduce processing time and in resolving archetype conditions.

Step 332 involves the inserting of information pertaining to characteristics of target code to be generated. Such characteristics include: whether or not the generated code is scalar (e.g., successive operations on corresponding elements of argument and result arrays); whether there is a single statement within any encompassing DO statements; whether there is only one statement in which the result is set; whether an element of the result may be set and then re-set; and whether an element of an argument may be used more than once.

After the sundry information is collected in the previous steps, step 334 is performed. In step 334, a determination is made as to which (and the manner in which) expressions in the master table may be combined or merged. As discussed in more detail hereinbelow, expressions may be merged by use or by similarity in shape. Merger by use includes (i) merger in which an expression may be merged with another expression anywhere in the program and (ii) merger to a specific point of use. It i noted that information provided in step 328—how far a statement may be moved—serves to determine which merger by use applies.

Expressions which can be moved to any point in the program are characterized (a) by having arguments which have the same value at all points of use, (b) by having results which are not function results and which do not appear in a CALL statement, and (c) by involving essentially no computations. Examples of expressions involving essentially no computation include: expressions with results that are single, known values; specifications of one variable by another; Monadic Iotas ($\iota$'s)—or interval vectors—wherein a subscript may replace a subscripted interval vector; "DROP's" having left arguments known to be negative; and "TAKE's" having a left argument known to be positive and not greater than the right argument dimensions. In the latter two instances, only a possible reduction in dimensions is involved.

An expression that does not satisfy the requirements for movement to any point in the program may satisfy requirements for movement to a single (next) point of use. In this regard, it is noted that the program is divided into a plurality of "basic blocks"—each of which corresponds to a sequence of APL statements that begins with a label or branch and ends with a label or branch and includes no labels or branches in between. In addition, code is not moved past a point where an argument of the simple expression is changed. Hence, movement of an expression to a single point of use within a basic block does not traverse any label or branch boundaries and avoids the problem of merging an expression to a point of use at which the "use" may have changed.

With regard to movement to a single point of use, if the elements of the result may be used repeatedly at the single point of use, it may be better not to move the code. If the code to be moved consists of a single statement within encompassing DO statements and the elements of the result of the code are each used only once, then the right-hand side of such single statement can be used in place of the result (left-hand side of the statement), any subscripts being adjusted accordingly. If the above condition does not hold, but each element of the result can be used as soon as produced, then the following steps apply. In the code being moved, the encompassing DO statements may be dropped, the result may be changed to a scalar, and the code being moved may be inserted at the point of use. The result of the code movement is to shorten the generated code, reduce traversals of DO statements, and reduce the requirement of storage for temporary arrays.

After movement by use is determined, movement by similarity may apply to unmoved code. An expressions unrelated to another expression except that the respective arguments of both have the same shapes, can be moved to share the DO statements corresponding to said other expression. Merger by similarity results in a reduction in the size of the target language code and in saving DO statement traversals.

Several types of merger are indicated below by example. Except for the first type which shows original APL and merged APL, each example includes an APL expression followed by FORTRAN code subjected to merger. In these latter examples, unmerged FORTRAN code is also included for comparison purposes.

The first type of merger involves moving an expression to all points of use, with complete merger. To illustrate this type of merger, original APL code in a sequence is shown together with code resulting after merger. It is noted that the expression for J, namely $\iota N$, replaces each occurrence of the variable J.

ORIGINAL APL CODE | CODE AFTER MERGER

```
J ← ιN
...                ...
K ← J + 3          K ← (ιN) + 3
...                ...
A ← B[J]           A ← B[ιN]
``` the next type of merger involves replacing an argument of one function, referred to as a "master" function, by an expression representing the result of another function. A "master" function is a function which includes a DO loop into which other functions are incorporated. In this regard, a master function is a "receiving" function into which other functions are merged. For $A \leftarrow B \times X + D$, instead of producing

```
    DO 100 I1 = 1,525
100 JT(I1) = JC(I1) + JD(I1)
    DO 110 I1 = 1,525
110 JA(I1) = JB(I1) * JT(I1)
``` this second type of merger produces

```
    DO 100 I1 = 1,525
100 JA(I1) = JB(I1) * (JC(I1) + JD(I1))
```

Also, according to the second type of merger, several functions can be combined. For $A \leftarrow (B+C) \times D - E$, instead of producing

```
    DO 100 I1 = 1,525
100 JT1(I1) = JD(I1) - JE(I1)
    DO 110 I1 = 1,525
110 JT2(I1) = JB(I1) + JC(I1)
    DO 120 I1 = 1,525
120 JA(I1) = JT2(I1) * JT1(I1)
``` second type merger produces

```
    DO 100 I1 = 1,525
100 JA(I1) = (JB(I1) + JC(I1)) * (JD(I1) - JE(I1))
```

The third type of merger is to incorporate the statements that produce an element of an argument for the master function in the DO nest for that function. For $A \leftarrow B \times +/M$, rather than generating

```
    DO 100 I1 = 1,525
    JT(I1) = JM(I1,1)
    DO 100 I2 = 2,154
100 JT(I1) = JT(I1) + JM(I1,I2)
    DO 110 I1 = 1,525
110 JA(I1) = JB(I1) * JT(I1)
``` third type merger results in

```
    DO 110 I1 = 1,525
    LT = JM(I1,1)
    DO 100 I2 = 2,154
100 LT = LT + JM(I1,I2)
110 JA(I1) = JB(I1) * LT
```

The last type of merging, or combining, functions involves unrelated computations whose results are the same shape. For example, for the two statements $A \leftarrow B \times C$ and $D \leftarrow E + F$, instead of generating

```
    DO 100 I1 = 1,68
    DO 100 I2 = 1,525
100 JA(I1,I2) = JB(I1,I2) * JC(I1,I2)
    DO 110 I1 = 1,68
    DO 110 I2 = 1,525
110 JD(I1,I2) = JE(I1,I2) + JF(I1,I2)
``` fourth type merger generates

```
    DO 100 I1 = 1,68
    DO 100 I2 = 1,525
    JA(I1,I2) = JB(I1,I2) * JC(I1,I2)
100 JD(I1,I2) = JE(I1,I2) + JF(I1,I2)
```

Merger according to the invention may be classified in various ways, resulting in differing types or numbers of types being defined. The mergers however are the same regardless of categorization.

A master function may have several other functions combined with it, in several of these ways.

After expressions which can be merged are determined and marked in step 334, variable names are reassigned (step 336) and final names are marked for use in the master table (step 338).

Following the forming of a master table for each function and the inclusion of additional information therein pursuant to the static analysis outlined in the above steps 300 through 338, the actual generation of target language code is performed. The general steps involved in generating the target language code are set forth in FIG. 10.

Figure 10:
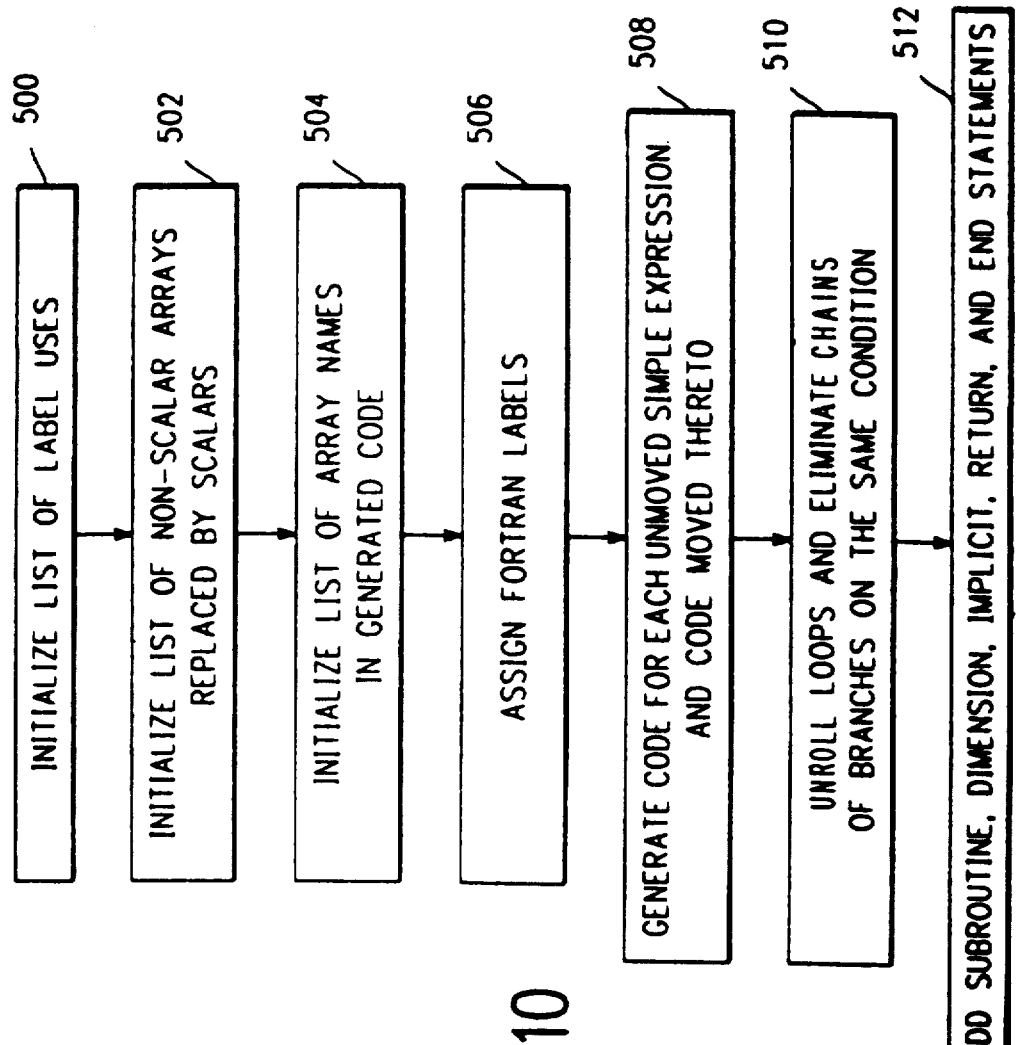
FIG. 10 is a general flowchart illustrating the major steps in generating code after the static analysis.

Referring to FIG. 10, a list of label uses is initialized at step 500. Labels not used may, accordingly, be deleted at a later time. In step 502, a list of non-scalar arrays which are replaced by scalars due to code movement and merger is initialized. In step 504, a list of array names appearing in the generated code is initialized. At a later time, the list is used in forming DIMENSION statements employed in FORTRAN. In step 506, FORTRAN labels are assigned. This step includes replacing APL labels with FORTRAN labels and, for FOR- TRAN labels having no APL counterparts, initializing the values therefor.

In this regard, it is noted that FORTRAN names can be at most six characters long. A prefix J is appended to APL names corresponding to fixed-point variables; V is appended to names of floating-point variables: E is appended to logical variables; and A is appended to character variables, shortening the names as necessary for FORTRAN and changing them slightly where shortened names would coincide. The n-th dimension of a variable is identified by the name of the variable with Jn prefixed. When a temporary non-scalar by a scalar within a DO loop, the leading A, E, J, or V is changed to B, F, L, or U.

As for FORTRAN objects that do not appear in the APL code, an I is prefixed to names of subscripts and a K, W, C, or G is prefixed to names of other fixed-point, floating-point, character, or logical variables. Elements of left arguments of certain functions, such as Reshape, if they are stored as separate variables, are given names beginning with a D, H, N, or X. FORTRAN dimensions, representing the storage space inside which variable-dimension arrays are stored, begin with an M. Variables associated with dynamic allocation begin with a Y.

To summarize the usage of FORTRAN names by prefix:

A—s VS FORTRAN character array that corresponds to an implicit or explicit APL character variable
B—like L, but character rather than fixed-point
C—like K, but character rather than fixed-point
D—like N, but character rather than fixed-point
E—a VS FORTRAN logical array that corresponds to an implicit or explicit APL Boolean variable
F—like L, but logical rather than fixed-point
G—like K, but logical rather than fixed-point
H—like N, but logical rather than fixed-point
H—a FORTRAN-only subscript (implicit in APL)
J—a FORTRAN fixed-point array that corresponds to an implicit or explicit APL integral variable
K—a FORTRAN fixed-point scalar that is not a subscript and does not correspond to any APL variable
L—a FORTRAN fixed-point scalar corresponding to a non-scalar APL array whose elements can be used as they are generated and do not need to be stored in a FORTRAN array
M—a FORTRAN array dimension which is the upper bound for the actual dimension
N—a separate name for an element of a fixed-point array
U—like L, but floating-rather than fixed-point
V—a FORTRAN floating-point array that corresponds to an implicit or explicit APL real variable
W—like K, but floating-rather than fixed-point
X—like N, but floating-rather than fixed-point
Y—an integer variable used in connection with dynamic storage allocation.

In APL, every non-indexed respecification of a name implies the use of a new copy of the variable if necessary, but in FORTRAN it does not. A temporary name may thus be used occasionally for a variable. Also, the APL interpreter converts an array from fixed-point to floating-point representation when integral values actually become or can be expected to become too large for fixed point; in the FORTRAN translation, action is based on expectation or possibility. Resulting changes are apparent to the user, since a name beginning with V or U is used.

If the same name is used for APL variables with different ranks or domains, then these variables will be given distinct names in FORTRAN.

FORTRAN labels end in either a 5 or 0. The former applies to user-supplied labels or labels inserted by the system so that a function has labels at the beginning and end. The 0 suffix applies to labels that are simply part of the FORTRAN translations of primitive functions. (Although the above-described labelling convention is featured in the invention, it is noted that some of the EXAMPLES set forth herein do not follow the convention where labels are identified as 1, 2, and the like for simplicity.)

In step 508, target language code is generated for each unmoved simple expression together with any code for expressions merged thereto. In generating the target language code, two types of basic functions are preferably handled in different ways. First, for those basic functions that do complex or specialized computations, equivalent FORTRAN programs are provided for the cases thereof, and appropriate call statements for these programs are inserted in the FORTRAN program under construction.

Second, for simple building block basic functions, the generated code relies solely on the contents of "archetypes" (i.e., macros or templates). For each simple basic function there is a respective archetype. Each archetype includes code representative of the corresponding target language code. As noted hereinbelow, the representative code may be target language code itself or may be a special code which correlates with target language code.

To the extent that a simple basic function is characterized by having a number of cases, the archetype thereof includes conditions the resolution of which determine the portions of the archetype code which shall be used in translation (e.g., replacing the source language—APL—code). Hence, although a simple basic function may apply in numerous cases, at a particular occurrence of such a basic function only a subset of the cases may possibly apply. By resolving the archetype conditions, code corresponding to impossible cases is deleted. The resolution of conditions, it is noted, is based on information accumulated in the static analysis and from user-entered declarations.

For purposes of illustrating the interplay between the static analysis and the code generation, a typical TAKE ( ↑ ) expression is considered: namely X ↑ Y. As noted previously, the TAKE function embodies numerous cases. If X exceeds $\rho Y$, there is an overtake; in which case the original matrix or array Y must be "padded" with 0's to increase its dimensions. If the first element of X is less than zero, the TAKE is from the right; if the first element of X is positive, the TAKE is from the left. The value of X relative to zero, and the relative values of X an $d\rho Y$ represent two conditions included in the TAKE archetype. A further condition involves the number of axis involved in the TAKE. The archetype for the TAKE function and, typically, other archetypes as well includes several portions of code: one portion of which applies generally regardless of condition and other portions which are applied depending on conditions. If, during the static analysis (including the shape analysis), it is determined that $X \leq \rho Y$, there is no overtake and the portion of code relating to "padding" the matrix or array Y is excluded during the code generation. Similarly, if X>O, the portion of code pertaining to a right TAKE is excluded. Moreover, if the TAKE involves the column axis but not the row axis (as in the FIG. 7 example), the portion of the archetype code specified for the row TAKE is excluded. By reducing cases, the resulting generated code is greatly simplified.

By way of summary, the producing of code for a basic function at a point of use consists principally of: selecting the archetype for that function and the result storage type; selecting the parts of the archetype that apply to the particular special case (using case selection indicators that are embedded in the archetype); expanding the rank-dependent parts of the archetype appropriately (using expansion indicators that are embedded in the archetype); substituting the actual values or names for the conventional names appearing in the archetype (for variables, ranks, shapes, subscripts, and so on); and simplifying the resulting code by evaluating some expressions that contain only arithmetic constants.

In step 510, very short lops are unrolled—i.e., the loop is replaced by a sequence of instances in which explicit values are substituted for the loop subscript. This step eliminates loop overhead with little or no increase in the length of the code. Unrolling loops of length two have a single non-DO statement (before unrolling) greatly improves the resulting code. Also in step 510, chains of branches on the same condition are eliminated to further enhance the code.

Finally at step 512, additional target language code statements are inserted, such as SUBROUTINE, DIMENSION, IMPLICIT, RETURN, and END. Also, preferably, a comment with at time stamp and version identification is inserted.

II. DETAILED FLOWCHART FOR COMBINING CODE AND EXAMPLES

FIG. 11 shows in detail the methodology of combining (or merger) code according to the present invention.

In step 600 a master table that includes simple APL expressions for a program is enlarged. Initially a master table contains, for each simple APL expression: (a) the function or operator symbol number encoded with any axis, operand, or flag numbers, (b) the result number, (c) the left argument number (if any), and (d) the right argument number.

First, three columns are added, in which are placed the items encoded in the numbers referred to in (a) in the previous paragraph. This decoding is done for convenience. In a given row, the first of these items is a number that indicates which function or operator is involved. The other two vary depending upon the function or operator. For an inner product, they will be the numbers of the two operand functions. For a reduction, they will be the number of the operand function and the axis along which it is to be applied. For a compression, one will be the axis along which the compression is to take place and the other, being unneeded, will be zero. For a branch, one will be a flag indicating the type of FORTRAN GO TO statement to be used and the other may indicate a relation to be tested, such as "less than" or "equal to or greater than". For other functions, one of them may be a flag indicating some special case, such as "specify all of the result from the first element of the argument" or "the number in the right argument position in this row is not the number of a variable but rather the actual value to be used for this argument".

In enlarged the master table, the following information is generated from pre-existing or pre-computed data: (a) the FORTRAN names of the variables involved: (b) for each indexing operation and axis, the name of an index or a flag showing that there is a constant index or that all elements are to be selected along that axis; (c) the shape variables for the result (of a simple expression) and its rank, and what category of variable the result falls into, such as a singleton array; (d) whether the result is a temporary (need not be retained after it is used); (e) whether arguments in an expression are identical and therefore re-used (such as in A—A); and (f) the maximum distance that code for an APL expression could be moved, in order to merge it. As noted hereinabove, the distance that code corresponding to a simple expression can be moved is determined, in part by basic blocks. That is, code is not to be moved past a use of its result or a setting of one of its arguments or, except in the special case where code involves essentially no computation and is to be moved to all points of use, past a label or a branch.

In addition, the following information related to the nature of code to be generated is inserted in the master table or elsewhere in storage; (a) whether the code is scalar, each element of the result being generated from corresponding elements of the arguments; (b) whether the code has but a single statement within its DO nest; (c) whether, although there may be several statements within the DO nest, there is but one in which the result is set; (d) whether an element of the result may be set and then re-set; (e) whether each element of the left argument is re-used for several result elements, as in the "Dyadic Iota" and the "Outer Product" APL functions; and (f) whether each element of the right argument is re-used for several result elements, as in the "Membership" and the "Outer Product" APL functions.

With the above additional information stored, the merger (or combining) of code is effectuated.

When code is to be moved, information is placed in its row of the master table indicating (a) whether the move is by use or by similarity; (b) whether (1) only the FORTRAN result expression is to be generated, or (2) all of the contents of the DO nest is to be generated and the result is to be changed to a scalar, or (3) all the contents of the DO nest is to be generated and the result is not to be changed to a scalar; (c) to what APL "receiving" expression—if any—code is to be moved; and (d) what APL expression is to be the "master expression" which supplies the DO nest. Case (b)(1), above, holds when the code, except for the DO nest, consists of a single, no-cost line and the code can be moved to all points of use. Case (b) (3) holds if the result of the merged APL expression is not a temporary of the merger is by similarity, not by use, Case (b)(2) holds if each element of the result will be used repeatedly but only for the same element of the result or if the code being moved consists of several statements (inside the DO nest). Lastly, Case (b)(1) holds when there is a single statement for a temporary variable whose elements will not be reused.

A pointer to the APL expression that is being merged is placed in the rows for receiving expressions and master expressions, with a flag telling how must of the code will be generated. If the receiving expression has a single statement within its DO nest and the merger is partial then it will now have several statements, and this fact is noted. In master table rows at which code is merged, information indicating the number of mergers (or combinations) occurring thereat is updated. This count is used in limiting the amount of code that is combined. A limit may be required to keep the FOR- TRAN statements to a reasonable size, to avoid running out of registers, to limit cache misses and page faults, or to ward off any other possible untoward effects of excessively combined code. This count relates to the COMBINE variable discussed previously. The COMBINE variable preferably enables the user to select, at various points in the application, respective degrees of permitted combining for various merger aspects—e.g., mergers wherein the results are scalars; mergers in which the results are variables (i.e., named arrays) that are non-scalar; and mergers in which results are any non-scalar arrays, including unnamed ones.

Merger is accomplished by performing four passes—successive passes involving less beneficial mergers. In this way, a less benefical merger will not, by changing the characteristics of the code or causing a merger limit to be reached, preclude another merger from being performed.

The first pass involves no-coast merger to all points of use. Starting at the beginning of the master table (step 602), the next (current subject) expression (if any) is examined (step 604). The effecting of full merger of the current subject expression to all points of use in a master table depends on the following conditions.

In the first condition, according to step 608, the code must involve no computational costs. Example 1 (below), which includes two translations of the same sequence of APL expressions, illustrates no-cost operations.

EXAMPLE 1. NO-COST MERGER

```
...
T←ιA
B←C[T]
D←(10,A)ρE[T]
...
```

The APL statements for Example 1 above illustrate two sample no-cost operations. In the first statement, T is a vector of integers from 1 through A; T is called an "interval vector38 and the operation is called Monadic Iota. As the second translation provided hereinbelow illustrates, there is no cost involved in the execution of Monadic Iota if it is combined with another operation. Likewise, the last line specifies the reshaping of a vector into a matrix of ten rows, each of which is the same as the vector; this reshaping will also be seen to involve essentially no cost.

An operation-by-operation first FORTRAN translation of the above-specified APL expressions is now shown. Four DO nests are transversed during the execution of this code and two temporary vectors are stored. JT1 is ιA and JT2 is E[T].

```
...
    DO 1 I1 = 1, JA
1    JT1(I1) = I1
    DO 2 I1 = 1, JA
2    JB(I1) = JC(JT1(I1))
    DO 3 I1 = 1, JA
3    JT2(I1) = JE(JT1(I1))
    DO 4 I2 = 1, JA
    DO 4 I1 = 1, 10
4       JD(I1, I2) = JT2(I2)
...
```

A second FORTRAN translation of the same above-specified APL expressions is now shown after no-cost operations are combined.

```
...
    DO 2 I1 = 1, JA
2    JB(I1) = JC(I1)
    DO 4 I2 = 1, JA
    DO 4 I1 = 1, 10
4       JD(I1, I2) = JE(I2)
...
```

Not only has the traversal of two DO loops and the storing of two temporary vectors been saved, as compared with the code in the first translation, but also the code in the first remaining loop is simpler. There is no cost involved in "computing" the Monadic Iota twice. Viewed another way, the result of the Monadic Iota is superfluous, its effect having been achieved by the use of its length in the upper limits for the two leading DO statements. The reshaping involves no cost because the length of the right argument is the same as the length of the rows of the result, so that the same subscript can be used for both.

A second condition of no-cost, all-points merger (see step 610) provides that the result appears neither in the subroutine header not in a CALL statement. This condition serves to avoid the problem of entering an array at a point of use involving a CALL, whereas at other points of use only an element of the array might be entered.

A third condition (step 612) relates to whether a subject current APL expression is the only setting of the result variable.

A fourth condition (step 614) relates to whether the arguments are unchanged at all points where the result is used.

It there is a single statement in the DO nest and the above four conditions apply, then the code for the current subject APL expression is moved to all points of use. At all points of use, the name of the result of the APL expression is replaced by the code for it.

Examples of no-cost code are Monadic Iota, suitably conforming reshapings, Reverse, Transpose, suitable indexings, and reshapings of single known constants or specifications by single known constants.

Also in the first pass, the APL function for the Inner Product is analyzed as two operations: a "midproduct" followed by a reduction. This analysis allows for any necessary type changes between the two operations. At this point in the code generation process the two parts of each Inner Product, together with any intervening type changes, are marked for combination. (This procedure would not be seen as a merger by the programmer, to whom the combined code would seen simply a special case of Inner Product, and it is carried out regardless of any limitations on the number of APL expressions that are allowed to be combined.) The Inner Product analysis performed according to steps 620 through 626 when there is no next current subject expression to be examined for no-cost, all-points merger (see step 604).

The second pass involves merger of temporaries by use in steps 630 through 646 and the third pass involves merger of non-scalar non-temporaries by use in steps 650 through 666. It is noted that the steps in these two passes are, to a large extent, similar. First, each temporary variable (in the second pass) and then each non-temporary non-scalar (in the third pass) merges into the first APL expression that uses it if (a) that expression is within the allowable limits for moving the code under consideration (and therefore is in the same basic block); (b) the limit on the number of combinations would not be exceeded for any of the expressions involved; (c) there is no repeated use of the result (as an argument) that would make calculation at that point of use undesirable; and (d) the use of subscripts in the code for the two APL expression is consistent.

The fourth pass involves merger of non-scalars by similarity. For each basic block, there is a check of each scalar function, simple specification, or type change that has not been combined and whose result is a non-scalar, non-unit array. If one of these items is followed in the same block by another such APL expression which has not been combined or is a master expression and whose result shape is the same, then the item is combined with that APL expression if the code can be moved that far. Merger by similarity is outlined in steps 670 through 692.

An example of merger by similarity is shown in the following Example 2.

EXAMPLE 2. MERGER BY SIMILARITY

```
    . . .
    A←B+C
    D←E*F
    . . .
```

Here neither A nor D is used in the computation of the other; i.e., they are not related by use. A combining is performed however because the arrays are of the same shape. The resulting FORTRAN code for the merger by similarity is listed below.

```
    . . .
    DO 1 I2 = 1, L2
    DO 1 I1 = 1, L1
        JA(I1, I2) = JB(I1, I2) + JC(I1, I2)
  1     JD(I1, I2) = JE(I1, I2) ** JF(I1, I2)
    . . .
```

The calculations of JA and of JD share the same DO nest, because their shapes are the same, thus saving the cost of going through the entire nest twice.

The following examples of code merger relate to merger by use. For purposes of comparison, each example sets forth a listing corresponding to a typical operation-by-operation type translation followed by a translation listing that includes merging (or combining) of code according to the present invention.

EXAMPLE 3. MERGER OF A COMPOUND APL EXPRESSION

```
    . . .
    A←(B+C×D÷E)[5]
    . . .
```

For a set of integer vectors of length 10, for example, the EXAMPLE 3 computation is reasonably efficient for an interpreter. Redundant arithmetic is done, but the savings achieved by doing the arithmetic only on the fifth element of each vector would probably be more than offset by the cost of indexing each vector. A typical operation-by-operation listing is set forth below.

```
    . . .
    DO 1 I=1,10
```

```
            -continued
  1     JT1(I)=JD(I)/JE(I)
    DO 2 I=1,10
  2     JT2(I)=JC(I)*JT1(I)
    DO 3 I=1,10
  3     JT3(I)=JB(I)+JT2(I)
    JA=JT3(5)
    . . .
```

It is noted that all the vectors must be subscripted; hence it is efficient to perform indexing on each vector immediately. This goal can be achieved by the general method of combining, or merging, operations as set forth in the following listing which includes some merger.

```
    . . .
    [DO 3 I=1,10
  3     JT3(I)=]JB(I)+JT2(I)
    JA=JT3(5)
    . . .

. . .
    JA=JB(5)+JT2(5)
    . . .
```

Because the addition is, except for the DO, complete in one line, the result expression from lines 5 and 6 can be substituted for the argument name in line 7. The FORTRAN code generator is (recursively) called for the addition, with the name "5" for the subscript it must insert. The FORTRAN code it returns (the result expression on line 6, with "5" for "I") is substituted for the entire subscripted name JT3(5). Thus, lines 5, 6, and 7 are replaced by the line JA=JP(5)+JT2(5). The addition is said to be "completely merged" (or "totally merged") into the indexing.

Extending this technique to the other functions in the example, the method below shows—for the compound APL expression of EXAMPLE 3—the merger of the division into the multiplication, the merger of the that result into the addition, and the merger of that result into the indexing.

```
    . . .
    JA=JB(5)+(JC(5)*(JD(5)/JE(5)))
    . . .
```

The transformation of a computation-then-selection sequence into a selection-then-computation sequence—as illustrated in EXAMPLE 3—has been called "dragging". Dragging is related to the fact that, in many instances, only parts of the results produced by APL basic functions will actually be used in the evaluation of subsequent basic functions. Consequently, if an APL processor could determine beforehand which parts would be used, it could restrict evaluation to those parts. Dragging is a strategy for accomplishing this restricted evaluation by deferring the evaluation of APL basic functions until the results are actually needed. The practice of evaluating an expression not when the program calls for that evaluation but rather, if possible, when the result is needed has been called "lazy evaluation" or "demand-driven evaluation". This practice is embodied in the present invention.

The next example of merger involves another APL compound expression.

EXAMPLE 4. MERGER OF A COMPOUND APL EXPRESSION

```
...
M←⌽ P+Q
...
```

No operations have been combined for the following (first) translation of the EXAMPLE 4 APL expression.

```
      ...
      DO 1 I2=1,L
        DO 1 I1=1,L
1       JT1(I1,I2)=JP(I1,I2)+JQ(I1,I2)
      DO 2 I2=1,L
        DO 2 I1=1,L
2       JT2(I1,I2)=JT1(I2,I1)
      DO 3 I2=1,L
        DO 3 I1=1,L
3       JM(I1,I2)=JT2(I1,L+1-I2)
      ...
```

All operations have been completely merged for the following translation of the APL expression in EXAMPLE 4.

```
      DO 3 I2=1,L
        DO 3 I1=1,L
3       JM(I1,I2)=JP(L+1-I2,I1)+JQ(L+1-I2,I1)
```

Combining reshaping operations, such as Transpose followed by Reverse as in EXAMPLE 4, is referred to as "beating". Beating is related to the fact that some APL basic functions have the effect of merely rearranging data, rather than changing its content and involves a method for combining the evaluations of sequences of such basic functions. The general concepts of "beating" and "dragging" are well-known techniques, introduced by P. S. Abrams in *An APL Machine*, PhD Dissertation, SLAC Report No. 114 (1970).

A further example of merger is illustrated in EXAMPLE 5 below.

EXAMPLE 5. PARTIAL MERGER OF A COMPOUND APL EXPRESSION

```
...
A←B+×C
...
```

The operation following the plus sign in this statement is Signum, with yields the sign of each element of its argument, i.e., one, zero, or negative one.

An operation-by-operation translation follows. Any reasonable FORTRAN translation of Signum of necessity contains more than one statement inside its DO nest.

```
      ...
      DO 1 I2=1,100
        DO 1 I1=1,1000
        IF (JC(I1,I2).GT.0) THEN
          JT(I1,I2)=1
        ELSE IF (JC(I1,I2).EQ.0) THEN
          JT(I1,I2)=0
        ELSE
          JT(I1,I2)=-1
        END IF
1     CONTINUE
```

```
      -continued
      DO 2 I2=1,100
        DO 2 I1=1,1000
2       JA(I1,I2)=JB(I1,I2)+JT(I1,I2)
      ...
```

A FORTRAN translation of the compound APL expression in EXAMPLE 5—with operations combined according to the present invention—is listed below.

```
      ...
      DO 1 I2=1,100
        DO 1 I1=1,1000
        IF (JC(I1,I2).GT.0) THEN
          LT=1
        ELSE IF (JC(I1,I2).EQ.0) THEN
          LT=0
        ELSE
          LT=-1
        END IF
1       JA(I1,I2)=JB(I1,I2)+LT
      ...
```

A variable must be set to hold the result of Signum, since Signum cannot be expressed simply as a term within the FORTRAN addition statement. Because each element of this result is used immediately, however, storage that was required for the matrix result in the uncombined case (set forth above) can be saved by setting a scalar temporary result. The Signum is said to be "partially merged" into the addition.

A further example of merger involves the multiple use of a temporary variable, referred to in EXAMPLE 6 as TV.

EXAMPLE 6. MERGER INVOLVING MULTIPLE USE OF A TEMPORARY VARIABLE

```
...
TV←A+B
C←TV×D
LBL:E←TV÷F
...
```

This sequence of APL operations differs from the previous examples in that the temporary TV is used in several places. The last line is labeled to indicate that it is the possible target of a branch and that the TV in it might, during some executions, be calculated elsewhere. Therefore the computation of TV shown in the first statement could not be incorporated in the third statement even if it were efficient to do so, although the result from the first statement must be available there.

Below is a listing of an operation-by-operation FORTRAN translation of the APL sequence in EXAMPLE 6.

```
      ...
      DO 1 I2=1,100
        DO 1 I1=1,1000
1       JTV(I1,I2)=JA(I1,I2)+JB(I1,I2)
      DO 2 I2=1,100
        DO 2 I1=1,1000
2       JC(I1,I2)=JTV(I1,I2)*JD(I1,I2)
3     DO 4 I2=1,100
        DO 4 I1=1,1000
4       JE(I1,I2)=JTV(I1,I2)/JF(I1,I2)
      ...
```

Three DO nests are traversed during the execution of the above operation-by-operation code. In the following translation, two operations are combined according to the present invention.

```
    DO 2  I2 = 1,100
       DO 2  I1 = 1,1000
          JTV(I1,I2) = JA(I1,I2) - JB(I1,I2]
 2        JC(I1,I2) = JTV(I1,I2)*JD(I1,I2)
 3  DO 4  I2 = 1,100
       DO 4  I1 = 1,1000
 4        JE(I1,I2) = JTV(I1,I2)/JF(I1,I2)
```

Although the matrix JTV must be formed, a partial combination of its code with that forming JC allows the entire computation to be done by transgressing only two DO nests, resulting in faster execution than the operation-by-operation translation. The addition is said to be "partially merged" into the multiplication.

As discussed earlier, there are impediments to code merger. EXAMPLE 7 sets forth an APL segment in which merger rules of the present invention preclude moving and merging code.

EXAMPLE 7. IMPEDIMENTS TO MOVING CODE

```
A ← B ← C
C ← D*E
F ← A , C
  ←(0∊C)/L1
G ← F - H
L1:I ← F ≤ J
```

In EXAMPLE 7, the variable A cannot be calculated during the forming of F, because the argument C used in calculating A has been changed. F cannot be calculated at either point of use because (a) if it were calculated at the first point and the branch were taken, it would be undefined at the second point; and (b) if it were calculated at the second point and the branch were not taken, it would be undefined at the first point.

In some instances, it is not desirable or merge or combine. As discussed earlier, merger in some instances may result in inefficiency (e.g., increased execution time) or other adverse consequences. In the following example, combination is not desirable.

EXAMPLE 8. UNDESIRABLE MERGER

```
A ← (B° + C)∊E × F
```

The central function of this APL statement is Membership. The result, A, is the same shape as the left argument; an element of A is one if the value of the corresponding element of the left argument can be found in the right argument and zero otherwise. The left argument is an Outer product, i.e., a matrix consisting of the sums of all possible combinations of elements of the vectors B and C. Because the right argument must be searched in some fashion for each element of the left argument, if its calculation were combined with Membership, its elements would each be repeatedly computed. Since multiplication is not a no-cost function, such repeated calculation is undesirable. Hence, a temporary array will always be formed for the right argument.

The following translation of the above EXAMPLE 8 distinguishes favorable merger from undesirable merger. In particular, the left argument can be merged—but only partially, since each element is used repeatedly in the innermost loop; it is held in the scalar JT2 during this use. The right argument cannot be merged without a large penalty in execution time, because its elements are each (potentially) used in all traversals of the outermost loop; it is computed as the vector JT1 in the first loop. The present translator, based on its rules of merger, avoids inefficient mergers.

```
      DO 1  I = 1, L
 1       JT1 = JE(I) * JF(I)
      DO 3  I2 = 1, L2
         DO 3  I1 = 1, L1
            JT2 = JB(I1) + JC(I2)
            DO 2  I3 = 1, L
               IF (JT2.EQ.JT1(I3)) THEN
                  JA(I1,I2) = .TRUE.
                  GO TO 3
               ENDIF
 2          CONTINUE
            JA(I1,I2) = .FALSE.
 3    CONTINUE
```

III. FLOWCHART OF CODE GENERATION

Referring to FIG. 12, a flowchart of the code generation phase of the present invention is illustrated. The flowchart of FIG. 12 follows step 338 of FIG. 4.

In step 700, code generation names for variables are again entered into the master table, since the names may have been altered as a result of the final storage allocations made after the merger phase. FORTRAN labels are assigned (step 702) and code-generation variables are initialized (step 704). By means of steps 706 through 710, master and uncombined APL expressions in the master table are examined in order. For a subject master or uncombined APL expression in the master table, a list is formed of the APL statements and APL expression derived from (a) the subject APL expression and (b) all APL expressions combined directly with or indirectly with the subject APL expression (step 712). Master expressions and expressions combined by similarity are considered one at a time (steps 714 and 716).

The generation of representative code for these expressions is performed by calling TRANSQD, which follows the steps 718 through 774 of FIG. 12.

That is, first, the names, ranks, shapes, shape variables, shape upper bounds, and shape lower bounds for all variables involved; the names of subscripts; the operations, flags, axes if relevant, and operands if relevant; and other information are obtained from the earlier static analysis (step 718). If a Reshape is specified, it is determine whether separate subscripts are necessary or whether one of the variables can use the subscripts of another (steps 720 and 722). If a Take or Drop, what information is known about which case applies (steps 724 and 726) is determined.

In steps 728 and 730, parts of the archetype are selected (based on resolved case-indicating conditions) and desired portions of the selected parts (e.g., all, nest contents, or result expression) are chosen.

In accordance with one mode of the invention, the archetypes are defined in a special archetype language that includes code abbreviations for certain common FORTRAN code, such as Branch-on-empty and DO nest.

For example, the ampersand in an expression—such as "&i.B"—represents DO statements that correspond to the various ranks of a given APL array. As noted hereinabove, due to FORTRAN limitations, the rank of an APL array that can be processed by the present translator must be no greater than seven. It assumed that the above ampersand expression is to be applied to an array Z having a rank ZR. For purposes of explanation, the ampersand expression may be "unrolled" and represented by a plurality of DO statements which depend on the rank ZR. That is, if $ZR \geq 1$, a DO statement for a dummy index $i1 = 1, \$z1$ is selected; if $ZR \geq 2$, a DO statement for a dummy index $i2 = 1, \$z2$ is also selected; and so on through the condition if $ZR = 7$ in which event a DO statement for a dummy index $i7 = 1, \$z7$ is also selected. The ampersand expression thus abbreviates one or more DO statements while, at the same time, accounting for rank dependence. The use of abbreviations results in shortened, easy-to-read code representative of the actual FORTRAN.

In step 732, abbreviations are expanded to elicit portions of the code represented thereby which is invoked.

In step 734, TRANSQD substitutes for the archetype's rank and shape indicators the proper ranks and shapes where possible; where shapes are not known, shape variables are used. In step 736, subscript indicators are replaced by actual subscript values where known and subscript variables elsewhere. In step 738, arithmetic terms are evaluated, for example, "5+7" is replaced by "12". In steps 740 and subsequent steps, the names of the arguments and result are substituted. The archetypes, it is noted, include dummy variables—such as the indexes i1 . . . i7 (which can be represented by a single variable "ia") and the limits $z1 . . . $z7 (which can be represented by "$za"). In the above steps, dummy variables are replaced by actual names, labels, or indicators that conform to the FORTRAN being generated.

With regard to substitutions for argument indicators, it is noted that the indicator for an argument is replaced in one of four ways. If the argument has a single, known value, the value is inserted. If it is not being obtained from merged code, its name is inserted. If it is being obtained from completely merged code, a FORTRAN expression for it is obtained by calling TRANSQD; the expression is then inserted in the code. If it is being obtained from partially merged code, its name is inserted, TRANSQD is called to create the code that computes it (i.e., its DO-nest contents), and that code is placed where there is an indicator for it in the current archetype. In this connection, it should be remarked that the name which is inserted for the argument when code is being partially merged is for its scalar form, i.e., it has no subscripts and the leading character in the name has been changed as hereinabove mentioned. This change is the same one that is made in step 772 of the recursive call to TRANSQD for this argument.

A result is always given a name.

Steps 754 and 768, it is observed, involve similar recursive calls of TRANSQD (except that the former pertains to left argument and the latter pertains to right argument). The recursive calls involve returning to step 718 and proceeding to step 754 or 768, respectively, to provide a desired result substitution for the left or right argument indicator. Similarly, steps 756 and 770 involve recursive calls of TRANSQD commencing at step 718. At steps 756 (770), DO nest contents for the left (right) argument are obtained and substituted in the archetype, with the left (right) argument indicator being replaced by a FORTRAN name.

In step 772, the result is changed to a scalar if the APL expression is being partially merged as discussed above. The declarations that will be needed in the DIMENSION statement are identified in step 774. The sequence of steps for TRANSQD ends with step 774. After step 774 is performed for a given expression selected from the set defined in step 714, a next expression is selected from the step 714 set and TRANSQD is repeated.

When code has been generated for all APL expressions in the set defined in step 714, i.e. there is no next expression in the set, step 780 is performed. Steps 780 through 784 involve the consolidating of the code generated for expressions associated with a single master expression. In step 780, the prologue (e.g., branch-on-empty or DO nest) for the nest associated with the master expression is appended to the code generated previously (e.g., for master expressions processed earlier). If the previously generated code ends with a CONTINUE statement which was not the object of a DO and the prologue begins with an unlabeled statement, the CONTINUE is deleted and the label therefor is applied to the prologue.

In step 782, the DO nest contents associated with the currently processed master expression is appended. In particular, code for the master expression and code for all expressions combined therewith by similarity are, in the order such code is generated, appended to the previously formed code listing.

An appropriate epilogue (if any) from the master expression is thereafter appended in step 784. For example, the CONTINUE target of a branch-on-empty is added on to the code listing.

After code for a given master expression is added to the code listing pursuant to steps 780 through 784, the next APL simple expression in the master table is selected in step 708 and steps 710 through 784 are applied (as appropriate) thereto.

When all APL expressions listed in the master table have been processed and code corresponding thereto has been incorporated into the (FORTRAN) code listing, step 786 follows step 708.

In step 786, FORTRAN DO loops that are to be performed only 1 to 3 times and that contain only one statement are "unrolled". That is, the loop is eliminated and the single statement is replicated the appropriate number of times.

Where a conditional branch goes to another conditional branch with the same condition or one such that if the first branch is taken then the second one will be also, the first branch is re-directed to go to the target of the second. The second branch is eliminated if the conditions are identical and the variables being tested cannot have changed (step 788).

In step 790, the FORTRAN is formatted—indenting two spaces for each DO or IF and ending that indentation after the object label of the DO or at the END IF, cumulatively.

In step 792, SUBROUTINE, IMPLICIT, DIMENSION, timestamp, and END statements are inserted. If any of the three characters that can be represented in FORTRAN programs only in hex form in a DATA statement actually occur in character data in the program, the required DATA statement is inserted so that they can be referred to by a variable name in the FORTRAN program.

In step 794, the APL listing and the FORTRAN code are correlated—changing from APL expression numbers (indices of rows in the master table in which expressions are described) to ISNs (FORTRAN Internal Statement Numbers), so that any messages from the FORTRAN compiler can be easily correlated with the APL code. The correlated ISNs are shown in some of the translation examples described herein.

Lastly, the FORTRAN code and the listing are written to CMS files in step 796. CMS is a conversational monitor system used in the IBM VM (Virtual Machine) environment. This step relates to a particular context for the invention.

IV. ARCHETYPE EXAMPLES

For each of at least some of the basic functions is a corresponding archetype. The archetype, as discussed hereinabove, typically includes portions of code which can be selected and imbedded conditions. Depending on how the conditions are resolved, different portions of the code can be selected. The resolution of the conditions is based on information derived during the static analysis or from user-furnished information.

One example of an archetype is set forth below.

EXAMPLE 9. THE ARCHETYPE FOR "MAXIMUM" (GREATER OF)

```
( Z, Y, & X are all same type--see conversion table )
→ı k .&ı S  .α.ω. S z(ı) = •
 |
   [(NONNEG YN)ΛXVΛ  =(ρXV) ' |←
      (v non-negative and x zero, so y )
      y(l)]
   [(NONNEG XN)ΛYVΛ  =(ρYV) ' | ← )
      x(r)]
   [ZT = 1 ←
      y(l).OR.x(r)]
   [1←
      MAX(y(l),x(r))]]
   k CONTINUE
```

In the example, the dash with a forward diagonal slash (−) strike-over symbolizes a selection. The FORTRAN name of the result is represented by z, of the left argument by y, and of the right argument by x. YN and XN represent the variable numbers of the left and right arguments. YV is a vector giving the value of the left argument with a preceding 1 as a validity indicator, if known; else a four-element vector consisting of a zero concatenated to a three-element vector that indicates whether no element of this argument can be negative or zero or positive, respectively, if known; else a single zero, indicating an unknown value. Likewise, XV is the value vector for the right argument. ZT is the type of the result and can be 0, 1, 2, or 3, meaning character, boolean, integral, or real. The first line and any other text so enclosed are comments. The first comment indicates that the code-generation type table (a fixed part of the translator) tells the static analysis section to put in type conversion expressions for one of the arguments and the result (if necessary) in order to make all three variables the same type in this operation.

It is observed that the archetype includes several imbedded conditions which determine the code to be used. The archetype reads as follows: Put in a branch to K on the condition that any dimensions that are unknown and could be zero actually are zero. That is the first expression after the comment provides for a branch around in the event of a null. The next expression involves putting in a nest of DOs for label $\underline{S}$ for the subscript set i. (The ampersand notation is described hereinabove.) The code before the vertical bar is dropped if this (maximum) operation is being partially merged. Stated otherwise, if applied for a master or uncombined expression, the whole archetype is considered. If partially merged, however, only the code represented between the two vertical bars is considered. Moreover, if the left argument has been partially combined—so that there are several lines of code generating the left argument—such code is placed where marked by the α. Similarly, lines of code corresponding to partial merger of the right argument are marked by the ω. The next expression indicates putting in S followed by "z(i)=" (where z is the result), followed by a symbol indicating that the rest of this statement is the code to be generated in the event, that this operation is completely merged. Then one of four pieces of code is selected, depending upon the arguments: If the left argument is nonnegative and the right argument is zero, then put in "y(l)"; l is the same as i unless the left argument is being extended, in which case it is all ones. Otherwise, if the right argument is nonnegative and the left zero, put in "x(r)"; r is like l, but for the right argument. Otherwise, if the variables are Boolean (as indicated by the result's being Boolean), the arguments are ORed. Otherwise, apply the FORTRAN MAX function to the arguments; actually, MAX is a generic name and the FORTRAN compiler will select the correct function based upon the argument types. Finally, unless the code is being partially merged (so only the material between bars is wanted), put in K CONTINUE. The semicolons represent separators between FORTRAN statements. After the code has been selected, appropriate substitutions are made for the subscripts, DO limits, labels, and variables.

The first two special cases of EXAMPLE 9 are included because often a length or shape, e.g., for the result of the Drop function, is calculated by an operation such as a subtraction followed by a setting of the result of that operation to zero if was negative, by taking the greater (the so-called "Maximum") of it and zero. If such code is included in a situation where it is known that the first operation cannot have a negative result, these special cases avoid an unnecessary operation.

Below is typical FORTRAN code produced from the archetype of EXAMPLE 9. It is observed that the left argument is a unit vector being extended and the right argument is of the rank 3, with unknown dimensions. All of the variables are integers.

```
   IF(L1.EQ.0.OR.L2.EQ.0) GO TO 2
   DO 1  I3 = 1, L3
      DO 1  I2 = 1, L2
         DO 1  I1 = 1, L1
1           JA(I1,I2,I3) = MAX(LB(1),JC(I1,I2,I3))
2  CONTINUE
   . . .
```

The following example illustrates the "unrolling" in archetypes.

EXAMPLE 10. UNROLLING IN ARCHETYPES

```
[↧YS;
   [a = YS ← s ]z(l,a,r) = x(l,a,r)]

For YS = 3:
```

-continued $z(l,1,r) = x(l,1,r); z(l,2,r) = x(l,2,r); $ $z(l,3,r) = x(l,3,r)$

As indicated by the code produced—see the lower portion of EXAMPLE 10—the material between the left bracket and the unrolling indicator + gives the instance numbers that are to be produced and the punctuation that is to appear between instances. The material to the right of + within the corresponding bracket is the code for which instances are to be produced. The instance numbers are substituted for any occurrences of "a" and then any selections are made; in this case, the label is selected from the last statement.

Below is typical code produced from the archetype of EXAMPLE 10. It is noted that the subscript set r is empty in this case.

```
           ...
           VN(I1,1) = VP(I1,1)
           VN(I1,2) = VP(I1,2)
       1   VN(I1,3) = VP(I1,3)
           ...
```

Archetypes may be interpreted. In such an embodiment, during code generation, the selection and unrolling indicators are found, their conditions evaluated, and pieces of code assembled accordingly. Until the archetypes are well debugged, it is helpful to use interpretation.

However, interpreting an archetype for each operation in a program to be translated is time-consuming. Hence, rather than interpretation, APL functions have been written to create code-generating functions, one of which is shown here. Whenever an archetype for some symbol and valence is altered, the code-generator-creating functions are invoked; using the new archetype, they create a new code-generating function, for that symbol and valence, which will be used during subsequent translations in order to generate the code for the operation of the archetype embodies. The code-generating function shown here is for the archetype for Maximum as illustrated in EXAMPLE 9.

EXAMPLE 11. A CODE-GENERATING FUNCTION

```
LN←GEN5V2ARCH;EXP
EXP←EXPS[KEYS[5,2,1;]+ι226]
LN←EXP[56+ι22]
→((NONNEG YN) ∧ XV ∧ +(ρXV) ↑ 1)/L1
→((NONNEG XN) ∧ YN ∧ +(ρYV) ↑ 1)/L2
→(ZT=1)/L3
LN←LN,EXP[199+ι14]
→L5
L1:LN←LN,EXP[141+ι4]
→L5
L2:LN←LN,EXP[172+ι4]
→L5
L3:LN←LN,EXP[183+ι12]
L5:LN←LN,EXP[215+ι11]
```

In reviewing the above code-generating example it should be recognized that all of the archetypes are preferably stored end-to-end as an APL vector named EXPS. The item KEYS provides the starting point (and length) for each archetype having a specific symbol and a specific valence. KEYS is automatically up-dated whenever EXPS is.

Looking specially at the code-generating function of EXAMPLE 11, it is noted that symbol 5 of valence 2 starts at position 1—based on the parameters corresponding to KEYS—and that the archetype is 226 characters in length. The length is determined when this archetype was last defined and can be used as a constant; the starting point in EXPS cannot be used as a constant because it will change if a preceding archetype is changed, and we do not want to have to recreate this function in that event.

In the third line of EXAMPLE 11, it is recognized that there are 56 characters in the comment (which are not be included) and that the next 22 characters are to be included. These 22 characters, starting with the "not" symbol and ending with the selection, correspond to the characters shown in the second line of EXAMPLE 9 (it being noted that such line divisions are not included in the stored vector EXPS). The four cases are then set forth. The first condition provides a branch to L1. The second condition provides a branch to L2. The third condition provides a branch to L3 depending on whether the type of Z (ZT) is Boolean. If none of the above branches are followed, an LN is provided which indicates the MAX option. For the MAX selection, it is noted that 199 characters are ignored and the next 14 (corresponding to the MAX expression in the archetype) are invoked, after which there is a branch to L5. The L1 and L2 branches similarly represent the respective four character strings "y(l)" and "x(r)". The L3 branch invokes the 12 characters of the archetype identified as "y(l).OR.x(r)". L5 serves to concatenate the CONTINUE.

From the above example, it is noted that the code-generating function serves to select the part of the archetype that applies in a given situation. In achieving this end, the code-generating function identifies the start point and length of each respective archetype; separates conditions from selectable code in the archetype; and represents the portions to be selected by EXP values. In sum, the code-generating functions permit the evaluation of conditions and the extracting of appropriate FORTRAN code from an archetype without having to interpret each operation in the archetype.

The above-described code-generating function is a direct result from the archetype of EXAMPLE 9. The EXAMPLE 9 archetype has been defined for FORTRAN. However, in accordance with the invention, the archetype may be tailored to some other scalar language as well, which could result in an alteration of the archetype. For example, if the archetype was to distinguish between the maximum of integers and the maximum of real numbers, two additional conditions may be added: ZT=2 for integer and ZT=3 for real. These two conditions would be listed, for example after the "ZT=1" condition in the EXAMPLE 9 archetype. The function which generates code-generating functions would be told that symbol 5 valence 2 has been altered; whereupon it will alter the code generating function therefor appropriately. Moreover, the numbering of characters in the archetype vector will also be appropriately adjusted.

Hence, archetypes, according to the present invention, may be applied to scalar languages in general. And the changing of a single archetype does not substantially affect other archetypes.

V. SPECIFIC EXAMPLE OF TRANSLATION

In the following example, various aspects of the invention are readily noted. The APL function in EX- AMPLE 12 is directed to finding the index of a word in a table.

EXAMPLE 12

```
1—LISTLOOKUPWORD
   DCL  CHARACTERDOMAINLIST,WORD
   DCL  500018SHAPELIST
   DCL  18SHAPEUBSWORD
   DCL  2SHAPELBSWORD
   □IO←1
1←(LIST[⍳⍴WORD]∧.=WORD) 1
```

This example demonstrates the use of declaratory statements; the effect of merger; the elimination of special cases to facilitate code; the correlation of FORTRAN ISN numbers with APL statements; the formatting of the FORTRAN code; and the inclusion of SUBROUTINE, IMPLICIT, DIMENSION statements.

It is noted that the lower bound on the shape of WORD—as set forth in a declaratory statement—eliminates special cases and thus makes the example simpler and clearer.

In particular, where the cases of word length 0 or 1 are handled differently than longer word lengths, the declaration facilitates the translation.

The index origin is set in the next to last line because the result of the Dyadic Iota in the last line depends upon the index origin and by making it known we again make the example simpler and clearer.

The following FORTRAN translation of the APL code in EXAMPLE 12 is based on the present invention with the COMBINE variable set to an OFF position so that no code merging takes place. Hence the code for the Monadic Iota, the indexing of LIST, the Inner product, and the Dyadic Iota are all separate. JYATOE and JYATOM are error-message variables.

```
       SUBROUTINE YAT036(J1,ALIST,AWORD,M1WORD,        (1)
       J1WORD,JYATOE,JYATOM,E37,cM137,A35,M135,M235)
       IMPLICIT CHARACTER(A-D),LOGICAL*1(E-H),          (2)
       INTEGER(I-P),REAL*8(Q-Z)
       DIMENSION ALIST(5000,18),AWORD(M1WORD),          (3)
       J33(18),A35(M135,M235),cE37(M137)
C      Translated to VS FORTRAN at 9.58 a.m.,
       Apr. 25, 1986 by BLVersion
C      3 & CGVersion 5.2, with 0 0 0 as global value
       of COMBINE.
       JYATOE = 0                                       (4)
       JYATOM = 0                                       (5)
       DO 1000 11 = 1,J1WORD                            (6)
1000   J33(11) = 11                                     7)
       DO 1010 12 = 1,J1WORD                            (8
       DO 1010 11 = 1,5000                              9
1010   A35(11,12) = ALIST(11,J33(12))                   10)
       DO 1030 11 = 1,5000                              (11
       E37(11) = .FALSE.                                12
       DO 1020 19 = 1,J1WORD                            13
1020   IF (.NOT.(A35(11,19).EQ.AWORD(19)))              14
       GO TO 1030
       E37(11) = .TRUE.                                 15
1030   CONTINUE                                         16)
       DO 1040 110 = 1,5000                             (17
       IF (E37(110)) GO TO 1050                         18
1040   CONTINUE                                         19
1050   J1 = 110                                         20)
       END                                              (21)
```

In the following FORTRAN translation for the APL code in EXAMPLE 12, Monadic Iota has been merged into the indexing of LIST, which has been merged into the Inner Product, which has been merged into the Dyadic Iota. Note that the Inner Product as shown in both the previous figure and this one, is a special case for And, and the Dyadic Iota is a special case where the argument is Boolean and the comparison is known to be to 1 (.TRUE.).

```
       SUBROUTINE YAT036(J1,ALIST,AWORD,M1WORD,         (1)
       J1WORD,JYATOE,JYATOM)
       IMPLICIT CHARACTER(A-D),LOGICAL*1(E-H),          (2)
       INTEGER(I-P),REAL*8(Q-Z)
       DIMENSION ALIST(5000,18),AWORD(M1WORD)
C      Translated to VS FORTRAN at 9:47 a.m.,
       Apr. 25, 1986 by BLVersion
C      3 & CGVersion 5.2, with 7 6 5 as global value
       of COMBINE.
       JYATOE = 0                                       (3)
       JYATOM = 0                                       (4)
       DO 1020 110 = 1,5000                             (5
       F37 = .FALSE.                                    6
       DO 1000 132 = 1,J1WORD                           7
1000   IF (.NOT.(ALIST(110,132).EQ.AWORD(132)))         8
       GO TO 1010
       F37 = .TRUE.                                     9
1010   IF (F37) GO TO 1030                              10
1020   CONTINUE                                         11
1030   J1 = 110                                         12)
       END                                              (13)
```

VI. RESTRICTIONS ON TRANSLATION

Translation according to the invention is restricted in two ways. First, some APL expressions to inhibit analysis that interpretation is likely to be as efficient as compilation. An example of this is a branch whose target cannot be deciphered and therefore might be any line of the function in which it appears; static analysis cannot proceed effectively with control flow information so restricted. Second, although variables are checked when a compiled function is called, if they are changed during the execution of a complied function in a way hidden to the translator then the results of static analysis and therefore the FORTRAN code may be rendered invalid. Such hidden changes could occur through the use of a compiled Execute, Evaluated Input, or Fix (establish function definition) whose possible arguments were not known during translation.

In accordance with the invention, expressions of the first kind are detected and rejected by the translator simply as a service to its user. Expressions of the second type, on the other hand, must necessarily be detected and rejected, since the methods described herein assume that an unknown character string will never be executed within compiled code. Hence Evaluated Input must always be rejected, since its argument is never known during translation, but an Execute with a known set of possible arguments can be compiled.

As a means of running mixed compiled and interpreted code, an APL2 name-resolving facility (Quard-NA) is used. Information relating to such a facility is contained in *APL2, IBM Program Number 5668-899, Release 2* in *APL2 Programming: Language Reference, IBM Publication SH20-9227* and in *APL2 Programming: System Services Reference, IBM Publication S20-9218.*

It is further noted that although a localized name may have disjoint uses with different types or ranks within a function, a global name must be used consistently throughout all functions being compiled together.

VII. OTHER FEATURES

In accordance with the present invention, code in an array source language such as APL is translated to a scalar target language such as FORTRAN wherein the source language features numerous functions, each of which are applicable differently in different cases. The present translation invention also generates, at certain points in the translation, target language code that evaluates several consecutive primitive functions at one time. In addition, an embodiment of the invention provides that an efficient target language compiler may be used on the code resulting from translation. Preferably, translation from VSAPL, APL2, or other similar languages to FORTRAN (VSFORTRAN, FORTRANG, or the like) or some other high level language is contemplated.

It is further noted that extension of scalars and unit arrays gives rise to restrictions of the first type, as noted above. VSAPL allows any one-element array that is an argument to a Dyadic scalar function to be extended to conform to the other argument. APL2 allows such extension for scalars and unit vectors. To provide the most efficient possible code, the present translator uses a narrow definition. It extends a variable to conform only if (1) its rank is different from the rank of the result of the scalar function to which it is an argument or (2) it is an array that clearly contains a single element, either because the user asserted it does or because the expression by which it was generated makes that fact clear. If neither of a pair of arguments to a scalar function meets the above criteria and they are not known to be of the same shape then the arguments are assumed to be of the same shape. This assumption is used not only to generate simple code for the scalar function in question but also to aid in the analysis of the entire APL program. Any such assumption is noted in the listing that is produced during translation and checked by statements inserted at the appropriate points in the FORTRAN code. The differing-ranks criterion is also used in determining extensions for some functions other than scalar ones. If the left argument of a Rotate, for instance, is a vector and the right argument is not a matrix, then the left argument is assumed to be of unit length and is made to conform to the right argument.

Other approaches to scalar extension—such as the VSAPL approach and lumping ambiguous cases together by applying MAX and MIN functions to subscripts and subscript limits—are also contemplated.

When it cannot be determined—during the translation of Indexed Specification, Compress, or Expand—whether or not extension will be needed, the various possible cases are provided for by branching or by the use of MAX and MIN. For Indexed Specification the possible extension is of a right argument that is a single-element array, to match the left argument, i.e., the index. For Expand, it is along the distinguished axis of the right argument, to match the left argument. For Compress, it is the extension of an argument with a unit dimension (either argument) along the distinguished axis to match the dimension of the other argument along that axis.

Scalar extension for the Inner Product is provided ONLY for known unit dimensions.

If something like ... JX( ..., MIN(JnX,lm), ... ). . . appears in translated FORTRAN code, the MIN expression probably represents an allowance for a possible extension. The user may specify whether extension is appropriate or, if the array involved are reasonably small, the expression should suffice. For large arrays, however, where executing the MIN function every time through the inner loop would be costly, the cases in the APL code should be separated, pointing out the separation by declaratory comments if necessary.

Also, in the aforedescribed embodiment, archetypes are written in a special language, with some standard abbreviations, and the case-determining conditions are defined in APL. The special language is representative of the target language—e.g., FORTRAN—and the abbreviations refer to often-used FORTRAN code. It is however contemplated that the archetype code may in fact be in target language, although such archetypes would be somewhat excessive in length.

It is further recognized that the present invention presumes that the programs being translated are correct. Most run-time checking, including domain checking, is not provided for in the translator—resulting in a reduction in overhead.

As an option, the present translator contemplates the use of archetypes as noted hereinabove for simple expressions (that may have a large variety of cases), such as Compress or Take, whereas for move complex functions (with typically relatively few different cases) FORTRAN subroutines are provided.

The present invention is readily implemented on various computer systems—such as the IBM VM (Virtual Machine)/System Product (Release 3). With such a system, compilation may be in APL2 (Release 2) and execution in CMS (Conversational Monitoring System) of VM or, alternatively, compilation and execution may be in APL2 (Release 2). In either of these VM settings, there is a link to a Translator disk, APL2 (release 2) is invoked, the compiler is loaded, a COMBINE value entered if the default value is not wanted, and instruments are entered to effectuate the compiling.

While the invention has been described with reference to preferred embodiments thereof, it will be understood by those skilled in the art that various changes in form and details may be made without departing from the scope of the invention as defined by the claims.

We claim:

1. A machine-implemented method of translating to a target computer language an application programmed in a source computer language wherein said source language is characterized by
    (A) having arrays as primitive objects thereof,
    (B) primitive functions which are applicable to arrays,
    (C) primitive functions in which internal representations are inferred from use, and
    (D) primitive functions which are applied differently in different cases depending upon differences in the rank, type, and shape information applicable to the arrays, the method comprising the steps of:
        (a) providing, for a subject primitive function of said source language which is applied differently in different cases, an archetype which includes
            (i) plural portions of code, which represent code in said target language, said portions being associated with corresponding cases in which the subject primitive function may be used, and
            (ii) conditions for determining which of said plural portions of archetype code are to be used for a given occurrence of the subject primitive function in a given application program in said source language with at least some of the conditions being dependent on array shapes,
        (b) storing said archetype in a machine memory, and (c) translating said subject primitive function from said source to said target language using said stored archetype, by selecting at least one of said portions of code therefrom in accordance with said conditions applicable to said given application program, when said given application program in said source language is input to a computer as the object of translation, to produce a translated application program in said target language.

2. The method of claim 1 comprising the further step of:
(d) unrolling expressions in an archetype to repeat operations defined thereby for array ranks.

3. The method of claim 1 comprising the further steps of:
(d) sectioning code of said given application program in said source language into individual programs, each said individual program including a defined source language function and all functions called by said defined source language function; and
(e) determining which of said individual programs are translatable with reference to their compilability in said target language; and
(f) translating said source language with the individual program representing the unit of translation.

4. The method of claim 3, comprising the further steps of:
pre-selecting programs the user wants translated; and applying step (e) to only the preselected programs.

5. The method of claim 3 comprising the further steps of:
(g) re-structuring the code of a subject program into a sequence of simple expressions in said source language; and
(h) performing a static analysis which includes the steps of deriving rank and variable storage-type information for data objects in the re-structured code and analyzing the shapes of arrays in the re-structured code, said shape analysis including the steps of:
(i) for each subject array in the subject program, assigning independent variables to all elements of the shape of the subject array and to all elements of arrays containing shape information about the subject array;
(ii) evaluating expressions that perform shape calculations;
(iii) determining classes of arrays having the same shape;
(iv) selecting, for each class of arrays having the same shape, a representative variable; and
(v) constructing a simple expression associated with the representative variable.

6. The method of claim 5 wherein the shape analysis includes the further step of:
inferring, from pairs of variables, when the shape of one variable in a given pair is always (i) equal to or (ii) less than or equal to the shape of the other variable in the given pair.

7. The method of claim 6 comprising the further steps of:
(j) forming a program list, wherein each called program follows the respective calling program thereof; and
(k) performing the static analysis of step (h) for each program in the order of the formed list.

8. The method of claim 5 wherein said representative variable selecting step includes the step of selecting the variable for that array of the class which is processed first in the program.

9. The method of claim 3 comprising the further steps of:
(g) re-structuring the code of a subject program into a sequence of simple expression in said source language; and
(h) combining expressions in the re-structured code.

10. The method of claim 9 comprising the further steps of:
(j) if a subject program is translatable, determining the applicable case for each simple expression in the restructured code;
(k) selecting archetype portions for the simple expressions based on the determined cases thereof; and
(l) combining, as appropriate, target language code corresponding to the selected portions of respective archetypes.

11. The method of claim 10 wherein the archetype storing step further includes the steps of:
(m) for a given piece of target language code corresponding to an archetype for a given case, inserting a first symbol to identify a first portion of said given piece and a second symbol to identify a second portion of said given piece; and
wherein said first portion is to be applied in the event of merger in accordance with the steps of
moving the code for a given expression in the restructured code to all points of use thereof subject to the conditions that the given expression (i) has no substantial computational cost, (ii) has a result which does not appear in a subroutine header or a CALL statement, (iii) is the only setting of the result variable, and (iv) all arguments remain unchanged at all points where the result is used; and
merging a temporary variable expression in a subject basic block into the first simple expression in the subject basic block that uses the temporary variable, subject to the condition that subscripts in the temporary variable expression and in the first expression of use are consistent;
and said second portion is to be applied in the event of partial merger in accordance with the steps of
emerging a non-temporary non-scalar variable expression in a specific basic block into the first simple expression in the specific basic block that uses the non-temporary non-scalar variable, subject to the condition that subscripts in the non-temporary variable expression and in the first expression that uses said non-temporary variable are consistent; and
combining expressions having the same shape into a common DO loop nest.

12. The method of claim 9 wherein the expression combining step includes the steps of:
(j) moving the code for a given expression in the restructured code to all points of use thereof subject to the conditions that the given expression (i) has no substantial computational cost, (ii) has a result which does not appear in a subroutine header or a CALL statement, (iii) is the only setting of the result variable, and (iv) all arguments remain unchanged at all points where the result is used.

13. The method of claim 12 wherein the expression combining step includes the further steps of:

(k) forming the re-structured code into basic blocks, a basic block being a sequence of statements in said source language starting with a label or branch statement and ending with a label or branch statement with no label or branch statement therebetween; and (l) merging a temporary variable expression in a subject basic block into the first simple expression in the subject basic block that uses the temporary variable, subject to the condition that subscripts in the temporary variable expression and in the first expression of use are consistent.

14. The method of claim 13 wherein the expression combining step includes the further step of:

(m) merging a non-temporary non-scalar variable expression in a specific basic block into the first simple expression in the specific basic block that uses the non-temporary non-scalar variable, subject to the condition that subscripts in the non-temporary variable expression and in the first expression that uses said non-temporary variable are consistent.

15. The method of claim 14 wherein the expression combining step comprises the further step of:

(n) combining expressions having the same shape into a common DO loop nest.

16. The method of claim 15 comprising the further step of:

(o) setting a variable to limit the degree of expression combining.

17. The method of claim 16 wherein the variable setting step includes the step of:

(p) selecting respective values of the number of expressions permitted to be combined in at least one of the steps (j), (l), (m), and (n).

18. The method of claim 17 comprising the further steps of:

(q) if a subject program is translatable, determining the applicable case for each simple expression in the restructured and combined code; and (r) representing each simple expression in the translatable program by the target language code corresponding to the determined case for the archetype thereof.

19. The system of claim 12 wherein said expression combining means further comprises:

means for forming the re-structured code into basic blocks, a basic block being a sequence of statements in said source language starting with a label or branch statement and ending with a label or branch statement with no label or branch statement therebetween; and means for merging a temporary variable expression in a subject basic block into the first simple expression in the subject basic block that uses the temporary variable, subject to the condition that subscripts in the temporary variable expression and in the first expression of use are consistent.

20. The system of claim 19 wherein said expression combining means further comprises:

means for merging a non-temporary non-scalar variable expression in a specific basic block into the first simple expression in the specific basic block that uses the non-temporary non-scalar variable, subject to the condition that subscripts in the non-temporary variable expression and in the first expression that uses said non-temporary variable are consistent.

21. The system of claim 20 wherein said expression combining means further comprises:

means for combining expressions having the same shape into a common DO loop nest.

22. The system of claim 21 further comprising:

means for setting a variable to limit the degree of expression combining.

23. The system of claim 22 wherein said variable setting means comprises:

means for selecting respective values for the number of expressions permitted to be combined by at least one of the means in said expression combining means.

24. The system of claim 23 further comprising:

means for determining the applicable case for each simple expression in the re-structured and combined code, if a subject program is translatable; and means for representing each simple expression in the translatable program by the target language code correspond to the determined case for the archetype thereof.

25. A system for translating to a target computer language an application programmed in a source computer language wherein said source language is characterized by:

(A) having arrays as primitive objects thereof;

(B) primitive functions which are applicable to arrays;

(C) primitive functions in which internal representations are inferred from use; and (D) primitive functions which are applied differently in different cases depending upon differences in the rank, type, and shape information applicable to the arrays, the system comprising: means for providing, for a subject primitive function of said source language which is applied differently in different cases, an archetype which includes:

(a) plural portions of code, which represent code in said target language, said portions being associated with corresponding cases in which the subject primitive function may be used; and (b) conditions for determining which of said plural portions of archetype code are to be used for a given occurrence of the subject primitive function in a given application program in said source to said source lanuage with at least some of the conditions being dependent on array shapes;

means for storing said archetypes in a machine memory; and means for translating said subject primitive function from said source to said target language using said stored archetype, by selecting at least one of said portions of code therefrom in accordance with said conditions applicable to said given application program, when said given application program in said source language is input to a computer as the object of translation, to produce a translated application program in said target language.

26. The system of claim 25 further comprising:

means for unrolling expressions in an archetype to repeat operations defined thereby for array ranks.

27. The system of claim 25 further comprising:

means for sectioning code of said given application program in said source language into individual programs, each said individual program including a defined source language function and all functions called said defined source language function;

means for determining which of said individual programs are translatable with reference to their compilability in said target language; and means for translating said source language with the individual program representing the use of translation.

28. The system of claim 27, further comprising:

means for pre-selecting programs the user wants translated; and means for applying said determining means to only the preselected program.

29. The system of claim 27 further comprising:

means for re-structuring the code of a subject program into a sequence of simple expressions in said source language; and means for performing a static analysis including:

means for deriving rank and variable storage-type information for data objects in the re-structured code; and means for analyzing the shapes of arrays in the re-structured code, said shape analysis including:

(i) for each subject array in the subject program, assigning independent variables to all elements of the shape of the subject array and to all elements of arrays containing shape information about the subject array;

(ii) evaluating expressions that perform shape calculations;

(iii) determining classes of arrays having the same shape;

(iv) selecting, for each class of arrays having the same shape, a representative variable; and (v) constructing a simple expression associated with the representative variable.

30. The system of claim 29 wherein said means for analyzing the shapes of arrays in the re-structured code comprises:

means for selecting said representative variables; and means for selecting the variable for that array of the class which is processed first in the program.

31. The system of claim 29 wherein said shape analysis means further comprises: means for inferring, from pairs of variables, when the shape of one variable in a given pair is always (i) equal to or (ii) less than or equal to the shape of the other variable in the given pair.

32. The system of claim 31 further comprising:

means for forming a program list, wherein each called program follows the respective calling program therefor; and means for actuating said static analysis means to perform said static analysis for each program in the order of the formed list.

33. The system of claim 27 further comprising:

means for re-structuring the code of a subject program into a sequence of simple expressions in said source language; and means for combining expressions in the re-structured code.

34. The system of claim 33 wherein said expression combining means comprises:

means for moving the code for a given expression in the restructured code to all points of use thereof subject to the conditions that the given expression (i) has no substantial computational cost, (ii) has a result which does not appear in a subroutine header or a CALL statement, (iii) is the only setting of the result variable, and (iv) all arguments remain unchanged at all points where the result is used.

35. The system of claim 33 further comprising:

means for determining the applicable case for each simple expression in the re-structured code, if a subject program is translatable;

means for selecting archetype portions for the simple expressions based on the determined cases thereof; and means for combining, as appropriate, target language code corresponding to the selected portions of respective archetypes.

36. The system of claim 35 wherein said archetype storing means further comprises:

means, for a given piece of target language code corresponding to an archetype for a given case, for inserting a first symbol to identify a first portion of said given piece and a second symbol to identify a second portion of said given piece; and means for applying said first portion in the event of merger in accordance with the operations of said moving means of claim 34 and said merging means of claim 19, and for applying said second portion in the event of partial merger in accordance with the operation of said merging means of claim 20 and said combining means of claim 21.

* * * * *

UNITED STATES PATENT AND TRADEMARK OFFICE
CERTIFICATE OF CORRECTION

PATENT NO. : 5,142,681
DATED : August 25, 1992
INVENTOR(S) : Graham C. Driscoll, et. al.

It is certified that error appears in the above-indentified patent and that said Letters Patent is hereby corrected as shown below:

Column 41, line 47, claim 19, should be dependent upon claim 33, rather than calim 12.

Signed and Sealed this

Seventh Day of September, 1993

Attest:

BRUCE LEHMAN

Attesting Officer

Commissioner of Patents and Trademarks